(12) United States Patent
Yokomakura et al.

(10) Patent No.: US 9,980,080 B2
(45) Date of Patent: May 22, 2018

(54) TERMINAL, METHOD, AND INTEGRATED CIRCUIT FOR CONTROLLING TRANSMIT POWERS

(71) Applicant: Sharp Kabushiki Kaisha, Sakai, Osaka (JP)

(72) Inventors: Kazunari Yokomakura, Sakai (JP); Tatsushi Aiba, Sakai (JP); Shoichi Suzuki, Sakai (JP); Hiroki Takahashi, Sakai (JP); Kimihiko Imamura, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days. days.

(21) Appl. No.: 15/329,655

(22) PCT Filed: Jul. 29, 2015

(86) PCT No.: PCT/JP2015/071463
§ 371 (c)(1),
(2) Date: Jan. 27, 2017

(87) PCT Pub. No.: WO2016/017672
PCT Pub. Date: Feb. 4, 2016

(65) Prior Publication Data
US 2017/0215027 A1 Jul. 27, 2017

(30) Foreign Application Priority Data
Jul. 29, 2014 (JP) .................. 2014-153640

(51) Int. Cl.
*H04W 4/00* (2018.01)
*H04L 29/08* (2006.01)
(Continued)

(52) U.S. Cl.
CPC ....... *H04W 4/005* (2013.01); *H04L 29/08306* (2013.01); *H04W 28/0221* (2013.01);
(Continued)

(58) Field of Classification Search
CPC ..... H04W 4/005; H04W 84/02; H04W 92/18; H04W 40/08; H04W 52/04; H04W 84/18; H04W 28/0221; H04L 29/08306
See application file for complete search history.

(56) References Cited

U.S. PATENT DOCUMENTS 9,326,303 B2 * 4/2016 Ji .................. H04W 76/021
2013/0157676 A1 6/2013 Baek et al.
(Continued)

FOREIGN PATENT DOCUMENTS

EP 3 177 092 A1 6/2017
WO WO-2013143580 A1 * 10/2013 ........... H04L 5/0091

OTHER PUBLICATIONS

Tripathi et al., LTE E-UTRAN and its Access Side Protocols, Jun. 15, 2009 [retrieved on Jan. 12, 2018]. Continuous Computing. Retrieved from the Internet:<URL: http://go.ccpu.com/rs/CCPU/images/wp-lte-eutran.pdf mkt_tok=3RkMMJWWfF9wsRonuaXKZKXonjHpfsX57uUqUaag38431 UFwdcjKPmjr1Y1FRMJ0dvycMRAVFZI5nS97KtU=>, pp. 1-21.*
(Continued)

*Primary Examiner* — Omar J Ghowrwal
(74) *Attorney, Agent, or Firm* — Keating & Bennett, LLP

(57) ABSTRACT

A first resource for transmission of first information is configured, a second resource for transmission of second information is configured, a third resource for transmission of a first synchronization signal and transmission of third information for indicating a frame number is configured, a fourth resource for transmission of a second synchronization signal and transmission of fourth information for indicating a frame number is configured, and a transmit power for each of the transmission of the first synchronization signal, the transmission of the third information, the transmission of the second synchronization signal, and the transmission of the fourth information is given by using one third parameter that
(Continued)

is configured in a higher layer and that is common to the transmission of the first synchronization signal, the transmission of the third information, the transmission of the second synchronization signal, and the transmission of the fourth information.

9 Claims, 7 Drawing Sheets

(51) Int. Cl.
    *H04W 84/02* (2009.01)
    *H04W 92/18* (2009.01)
    *H04W 40/08* (2009.01)
    *H04W 52/04* (2009.01)
    *H04W 84/18* (2009.01)
    *H04W 28/02* (2009.01)

(52) U.S. Cl.
    CPC ........... *H04W 40/08* (2013.01); *H04W 52/04* (2013.01); *H04W 84/02* (2013.01); *H04W 84/18* (2013.01); *H04W 92/18* (2013.01)

(56) References Cited

U.S. PATENT DOCUMENTS

| 2014/0094213 | A1  | 4/2014 | Khoshnevis et al. |
| 2015/0009949 | A1* | 1/2015 | Khoryaev ............. H04W 48/16 370/330 |
| 2016/0219541 | A1* | 7/2016 | Chatterjee ......... H04W 36/0055 |
| 2017/0215159 | A1* | 7/2017 | Yokomakura ....... H04W 56/001 |

OTHER PUBLICATIONS

Ericsson et al., "D2D for LTE Proximity Services: Overview", 3GPP TSG-RAN WG1 #73, R1-132028, May 20-24, 2013, pp. 1-6.

* cited by examiner

TERMINAL, METHOD, AND INTEGRATED CIRCUIT FOR CONTROLLING TRANSMIT POWERS

TECHNICAL FIELD

The present invention relates to a terminal device, a base station device, a communication method, and an integrated circuit.

This application claims the benefit of Japanese Priority Patent Application No. 2014-153640 filed on Jul. 29, 2014, the entire contents of which are incorporated herein by reference.

BACKGROUND ART

In the 3rd Generation Partnership Project (3GPP), a radio access scheme (Evolved Universal Terrestrial Radio Access (EUTRA)) and a radio access network (Evolved Universal Terrestrial Radio Access Network (EUTRAN)) for cellular mobile communication have been considered. The EUTRA and the EUTRAN are also referred to as Long Term Evolution (LTE). In LTE, a base station device is also referred to as an evolved NodeB (eNodeB) and a terminal device is also referred to as a User Equipment (UE). LTE is a cellular communication system in which an area is divided in a cellular pattern into multiple cells, each being served by a base station device. A single base station device may manage multiple cells.

In 3GPP, Proximity based Services (ProSe) have been considered. ProSe includes ProSe discovery and ProSe communication. The ProSe discovery is a process which specifies that a terminal device is brought in proximity to a different terminal device using the EUTRA. The ProSe communication is communication between two terminal devices that are brought in proximity to each other using a EUTRAN communication path that is established between the two terminals. For example, the communication path may be established directly between the terminal devices.

The ProSe discovery and the ProSe communication are also referred to as Device to Device (D2D) discovery and D2D communication, respectively. The ProSe discovery and the ProSe communication are also collectively referred to as ProSe. The D2D discovery (device discovery) and the D2D communication (device communication) are also collectively referred to as the D2D. At this point, the communication path is also referred to as a link.

In NPL 1, it is disclosed that a subset of resource blocks is reserved for the D2D, that a network configures a set of D2D resources, and that the terminal device is allowed to transmit a D2D signal using the configured resources.

CITATION LIST

Non Patent Document

[NON PATENT DOCUMENT 1] "D2D for LTE Proximity Services: Overview", R1-132028, 3GPP TSG-RAN WG1 Meeting #73, 20-24 May 2013

DISCLOSURE OF THE INVENTION

Problems to be Solved by the Invention

However, processing when the terminal device performs the D2D communication has not been sufficiently considered. According to the present invention, there are provided a terminal device that is capable of efficiently performing D2D, a base station device that controls the terminal device, an integrated circuit that is built in the terminal device, a base station device that is used in the base station device, a communication method that is used in the terminal device, and a communication method that is used in the base station device.

Means for Solving the Problems (1) According to an aspect of the present invention, there is provided a terminal device, in which a first resource for transmission of first information that is used for scheduling a physical channel is configured, the physical channel being used for transmission of second information from the terminal device to a different terminal device, in which a second resource for the transmission of the second information is configured, in which a third resource for transmission of a first synchronization signal and transmission of third information for indicating a frame number is configured, in which a fourth resource for transmission of a second synchronization signal and transmission of fourth information for indicating a frame number is configured, in which a transmit power for the transmission of the first information is given by using a first parameter that is configured in a higher layer, in which a transmit power for the transmission of the second information is given by using a second parameter that is configured in the higher layer, and in which a transmit power for each of the transmission of the first synchronization signal, the transmission of the third information, the transmission of the second synchronization signal, and the transmission of the fourth information is given by using one third parameter that is configured in the higher layer and that is common to the transmission of the first synchronization signal, the transmission of the third information, the transmission of the second synchronization signal, and the transmission of the fourth information.

(2) Furthermore, in the terminal device according to another aspect of the present invention, the first information, the first synchronization signal, the third information, the second synchronization signal, and the fourth information that are transmitted are received by the different terminal device.

(3) Furthermore, in the terminal device according to another aspect of the present invention, the third resource is based on a fourth parameter in the higher layer, and the fourth resource is based on a fifth parameter in the higher layer.

(4) Furthermore, according to another aspect of the present invention, there is provided a communication method, including: configuring a first resource for transmission of first information that is used for scheduling a physical channel, the physical channel being used for transmission of second information from the terminal device to a different terminal device; configuring a second resource for the transmission of the second information; configuring a third resource for transmission of a first synchronization signal and transmission of third information for indicating a frame number; configuring a fourth resource for transmission of a second synchronization signal and transmission of fourth information for indicating a frame number; giving a transmit power for the transmission of the first information by using a first parameter that is configured in a higher layer; giving a transmit power for the transmission of the second information by using a second parameter that is configured in the higher layer; and giving a transmit power for each of the transmission of the first synchronization signal, the transmission of the third information, the transmission of the second synchronization signal, and the transmission of the fourth information by using one third parameter that is configured in the higher layer and that is common to the transmission of the first synchronization signal, the transmission of the third information, the transmission of the second synchronization signal, and the transmission of the fourth information.

(5) Furthermore, in the communication method according to another aspect of the present invention, the first information, the first synchronization signal, the third information, the second synchronization signal, and the fourth information that are transmitted are received by the different terminal device.

(6) Furthermore, in the communication method according to another aspect of the present invention, the third resource is based on a fourth parameter in the higher layer, and the fourth resource is based on a fifth parameter in the higher layer.

(7) Furthermore, according to another aspect of the present invention, there is provided an integrated circuit which causes a terminal device to perform functions of: configuring a first resource for transmission of first information that is used for scheduling a physical channel, the physical channel being used for transmission of second information from the terminal device to a different terminal device; configuring a second resource for the transmission of the second information; configuring a third resource for transmission of a first synchronization signal and transmission of third information for indicating a frame number; configuring a fourth resource for transmission of a second synchronization signal and transmission of fourth information for indicating a frame number; in which a transmit power for the transmission of the first information is given by using a first parameter that is configured in a higher layer; in which a transmit power for the transmission of the second information is given by using a second parameter that is configured in the higher layer; and in which a transmit power for each of the transmission of the first synchronization signal, the transmission of the third information, the transmission of the second synchronization signal, and the transmission of the fourth information is given by using one third parameter that is configured in the higher layer and that is common to the transmission of the first synchronization signal, the transmission of the third information, the transmission of the second synchronization signal, and the transmission of the fourth information.

(8) Furthermore, in the integrated circuit according to another aspect of the present invention, the first information, the first synchronization signal, the third information, the second synchronization signal, and the fourth information that are transmitted are received by the different terminal device.

(9) Furthermore, in the integrated circuit according to another aspect of the present invention, the third resource is based on a fourth parameter in the higher layer, and the fourth resource is based on a fifth parameter in the higher layer.

Effects of the Invention

According to the invention, a terminal device is capable of efficiently performing D2D.

MODE FOR CARRYING OUT THE INVENTION

Embodiments of the present invention will be described below.

According to the present embodiment, one or multiple cells are configured for a terminal device. A technology in which the terminal device performs communication through multiple cells is referred to as cell aggregation or carrier aggregation. The present invention may apply to each of the multiple cells that are configured for the terminal device. Furthermore, the present invention may apply to some of the multiple cells that are configured. A cell that is configured for the terminal device is referred to as a serving cell. The serving cell is used for communication for a EUTRAN. A cell that is configured for D2D is referred to as a D2D cell. The D2D cell may be the serving cell. Furthermore, the D2D cell may be a cell other than the serving cell.

Multiple serving cells that are configured include one primary cell, or one or multiple secondary cells. A primary cell is a serving cell in which an initial connection establishment procedure is executed, a serving cell in which a connection re-establishment procedure is started, or a cell that is designated as a primary cell during a handover procedure. At a point in time at which a Radio Resource Control (RRC) connection is established, or later, the secondary cell may be configured.

In the case of the cell aggregation, a Time Division Duplex (TDD) scheme or a Frequency Division Duplex (FDD) scheme may apply to all multiple cells. Furthermore, a cell to which the TDD scheme applies and a cell to which the FDD scheme applies may be aggregated.

Figure 1:
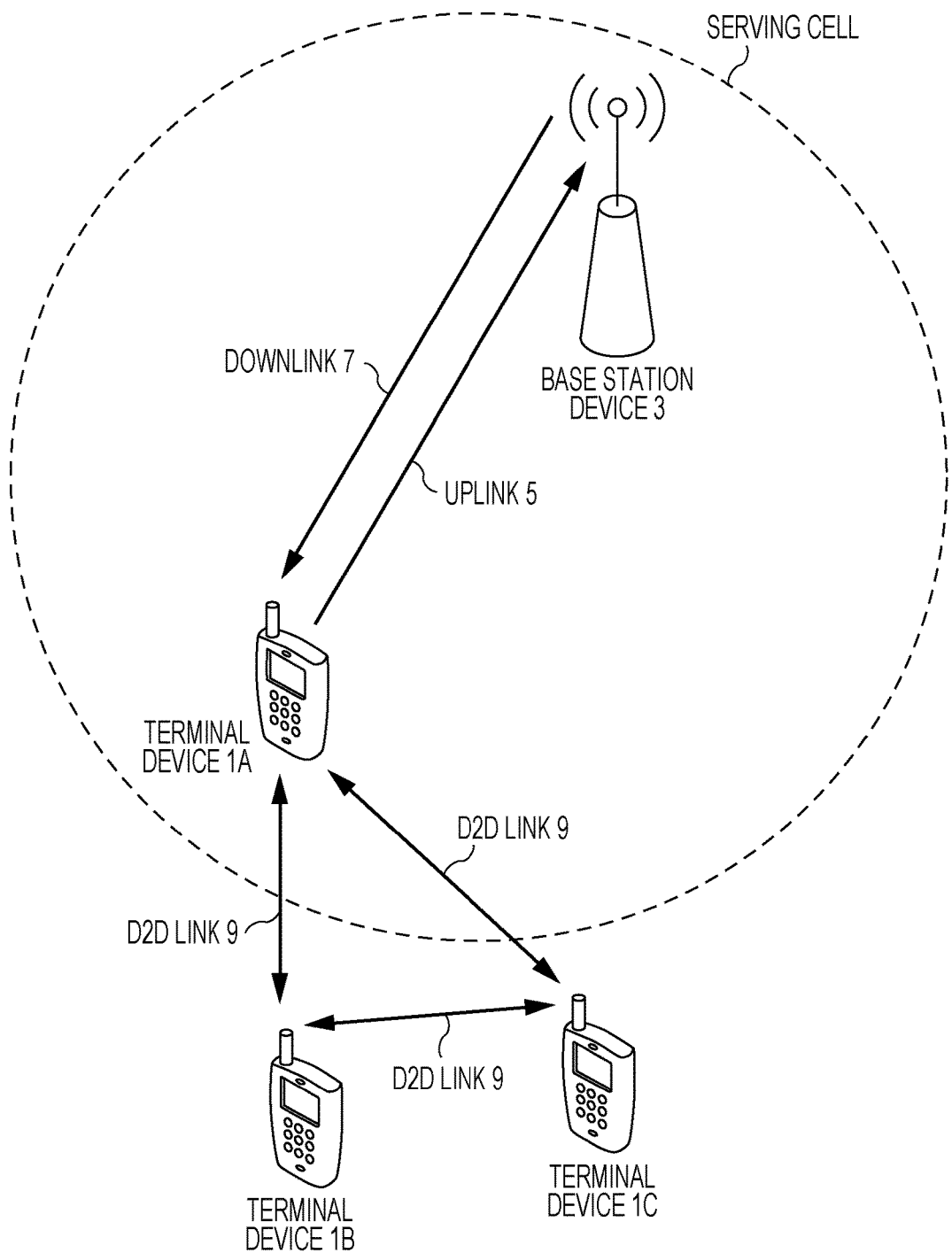
FIG. 1 is a conceptual diagram of a wireless communication system according to the present embodiment.

FIG. 1 is a conceptual diagram of a wireless communication system according to the present embodiment. In FIG. 1, the wireless communication system includes terminal devices 1A to 1C and a base station device 3. The terminal devices 1A to 1C are referred to as a terminal device 1. A serving cell 4 indicates an area (coverage) that is covered by the base station device 3 (LTE or the EUTRAN). At this point, the terminal device 1A is in EUTRAN coverage. Furthermore, the terminal device 1B and the terminal device 1C are out of the EUTRAN coverage.

An uplink 5 is a link from the terminal device 1 to the base station device 3. Moreover, in the uplink 5, a signal may be transmitted directly from the terminal device 1 to the base station device 3 without involving the repeater. A downlink 7 is a link from the base station device 3 to the terminal device 1. Furthermore, the uplink 5 and the downlink 7 are also referred to as a cellular link or a cellular communication path. Furthermore, communication between the terminal device 1 and the base station device 3 is also referred to cellular communication or communication with the EUTRAN.

A D2D link 9 is a link between the terminal devices 1. Moreover, the D2D link 9 is also referred to as a D2D communication path, a ProSe link, or a ProSe communication path. D2D discovery and D2D communication are performed over the D2D link 9. The D2D discovery is a process/procedure which specifies that the terminal device 1 is brought in proximity to a different terminal device 1 using a EUTRA. The D2D communication is communication between multiple terminal devices 1 that are brought in proximity to one another using a EUTRAN communication path that is established between the multiple terminal devices 1. For example, the communication path may be established directly between the terminal devices 1.

A physical channel and a physical signal according to the present embodiment are described.

A downlink physical channel and a downlink physical signal are collectively referred to as a downlink signal. An uplink physical channel and an uplink physical signal are collectively referred to as an uplink signal. A D2D physical channel and a D2D physical signal are collectively referred to as a D2D signal. The physical channel is used for transmitting information that is output from a higher layer. The physical signal is not used for transmitting the information that is output from the higher layer, but is used by a physical layer.

In FIG. 1, the following D2D physical channels are used for wireless communication over the D2D link 9 between the terminal devices 1.

Physical Device to Device Synchronization Channel (PD2DSCH)

Physical Device to Device Data Channel (PD2DDCH)

The PD2DSCH is used for information relating to synchronization. For example, the information relating to the synchronization includes a D2D frame number or a System Frame Number (SFN).

The PD2DDCH is used for transmitting D2D data (a ProSe communication Shared Channel (PSCH)) and Device to Device Scheduling Assignment (D2DSA). The D2D data and the D2DSA are not mapped to the same PD2DSCH. The D2DSA is used for scheduling of the PD2DSCH that is used for transmission of the D2D data. For example, the D2DSA includes information indicating a resource for the PD2DSCH that is used for the transmission of the D2D data, information indicating a destination identifier (a destination identity), information indicating a source identifier (a source identity), and the like. At this point, the D2D data and the D2DSA that correspond to the D2D discovery are referred to as a discovery signal. Furthermore, the D2D data and the D2DSA that correspond to the D2D communication are referred to as a communication signal.

The PD2DSCH may be a Physical Uplink Shared Channel (PUSCH). That is, the PUSCH may be used for transmission of the D2D data and the D2DSA. According to the present embodiment, the PUSCH that is used for the D2D is referred to as the PD2DSCH. According to the present embodiment, the PUSCH that is used for the communication with the EUTRAN is simply expressed as the PUSCH. The PUSCH will be described in detail below.

In FIG. 1, the following D2D physical signals are used for D2D wireless communication.

D2D Synchronization Signal (D2DSS)

D2D Reference Signal (D2DRS)

The D2DSS is used for being synchronized in a D2D link. The D2DSS includes a Primary D2D Synchronization Signal (PD2DSS) and a Secondary D2D synchronization Signal (SD2DSS). The D2DSS is associated with transmission of the PD2DSCH. The D2DSS may be time-multiplexed with the PD2DSCH. The terminal device 1 may use the D2DSS in order to perform channel reconfiguration of the PD2DSCH.

At this point, the D2DSS may be transmitted at periodic points in time (periodically) using a periodicity that is configured by the base station device, or a periodicity that is pre-configured. Furthermore, the D2DSS may be transmitted using a resource (for example, a head subframe (one portion of the head subframe, or the like)) in a resource pool that is configured by the base station device) that is pre-configured by the base station device, or using a resource (for example, a head subframe (one portion of the head subframe, or the like)) in a resource pool that is pre-configured) that is pre-configured.

Furthermore, the terminal device 1 may transmit the D2DSS, only when that terminal device 1 is a synchronization source. That is, the terminal device 1 can be the synchronization source. Moreover, the terminal device 1 may be the synchronization source in a case where the base station device 3 instructs the terminal device 1 to do so. Furthermore, in a case where the synchronization source is not present in the vicinity of that terminal device 1 (in a case where it is determined that the synchronization source is not present there), the terminal device 1 may be the synchronization source. When it comes to the terminal device 1 that wants to be the synchronization source, that terminal device can transmit the D2D signal according to a receiving timing of the D2DSS from the synchronization source.

The D2DRS is associated with transmission of the PD2DSCH or the PD2DDCH. The D2DRS may be time-multiplexed with the PUSCH or PUCCH. The terminal device 1 may use the D2DRS in order to perform the channel reconfiguration of the PD2DSCH.

From the perspective of the terminal device 1 that performs transmission, the terminal device 1 can operate in two modes (a mode 1 and a mode 2) for allocation of a resource to the D2D communication.

In the mode 1, the EUTRAN (the base station device 3) schedules a correct resource that is used by the terminal device 1 for transmission of the communication signal (the D2D data and the D2DSA). That is, in the mode 1, for the terminal device 1, the resource for the transmission of the transmission signal (the D2D data and the D2DSA) is scheduled by the EUTRAN (the base station device 3).

In the mode 2, the terminal device 1 selects a resource from the resource pool for the transmission of the communication signal (the D2D data and the D2DSA). That is, in the mode 2, the resource for the transmission of the communication signal (the D2D data and the D2DSA) is selected by the terminal device 1. The resource pool is a set of resources. A resource pool for the mode 2 may be configured/limited semi-statically by the EUTRAN (the base station device 3). Furthermore, the resource pool for the mode 2 may be pre-configured.

The terminal device 1 that has the capability of the D2D communication, which is in the EUTRAN coverage, may support the mode 1 and the mode 2. The terminal device 1 that has the capability of the D2D communication, which is out of the EUTRAN coverage, may support only the mode 2. The base station device 3 may instruct the terminal device 1 on whether the terminal device 1 operates in the mode 1 or in the mode 2. For example, the base station device 3 may transmit information (a parameter) for designating weather the terminal device 1 operates in the mode 1 or in the mode 2, to the terminal device 1, in a state of being included in a higher layer signal.

Furthermore, two types (a type 1 and a type 2) are defined as D2D discovery procedures.

The type 1 of D2D discovery procedure is a D2D discovery procedure in which a resource for the discovery signal is not dedicatedly allocated to the terminal device 1. That is, in the type 1 of D2D discovery procedure, the resource for the discovery signal may be allocated to all terminal devices 1 or a group of terminal devices 1.

The type 2 of D2D discovery procedure is a D2D discovery procedure in which the resource for the discovery signal is dedicatedly allocated to the terminal device 1. The discovery procedure in which a resource is allocated to each of the transmission instances dedicated to the discovery signal is referred to as a type 2A discovery procedure. The type 2 of discovery procedure in which a resource is allocated semi-persistently for the transmission of the discovery signal is referred to as a type 2B discovery procedure.

In FIG. 1, the following uplink physical channels are used for uplink wireless communication.

Physical Uplink Control Channel (PUCCH)
Physical Uplink Shared Channel (PUSCH)
Physical Random Access Channel (PRACH)

The PUCCH is a physical channel that is used for transmitting Uplink Control Information (UCI).

The PUSCH is a physical channel that is used for transmitting uplink data (Uplink-Shared Channel (UL-SCH)) and/or a HARQ-ACK and/or channel state information.

The PRACH is a physical channel that is used for transmitting a random access preamble. The PRACH is used for the initial connection establishment procedure, the handover procedure, and the connection re-establishment procedure.

In FIG. 1, the following uplink physical signal is used for the uplink wireless communication.

Uplink Reference Signal (UL RS)

According to the present embodiment, the following two types of uplink reference signals are used.

Demodulation Reference Signal (DMRS)
Sounding Reference Signal (SRS)

The DMRS is associated with transmission of the PUSCH or the PUCCH. The DMRS is time-multiplexed with the PUSCH or the PUCCH. The base station device 3 uses the DMRS in order to perform the channel reconfiguration of the PUSCH or the PUCCH. The SRS is not associated with the transmission of the PUSCH or the PUCCH. The base station device 3 uses the SRS in order to measure an uplink channel state.

In FIG. 1, the following downlink physical channels are used for downlink wireless communication.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

The PBCH is used for broadcasting a Master Information Block (MIB) (Broadcast Channel (BCH)) that is used in a shared manner in the terminal device 1. For example, the MIB includes information indicating the SFN. The system frame number (SFN) is a radio frame number. The MIB is system information.

The PCFICH is used for transmitting information that indicates a region (an OFDM symbol) which is used for transmission of the PDCCH.

The PHICH is used for transmitting a HARQ indicator indicating an ACKnowledgement (ACK) of or a Negative ACKnowledgement (NACK) of the uplink data (the Uplink Shared Channel (UL-SCH)) that is received by the base station device 3.

The PDCCH and the EPDCCH are used for transmitting Downlink Control Information (DCI). The Downlink Control Information is also referred to as a DCI format. The Downlink Control Information includes a downlink grant, an uplink grant, and a D2D grant. The downlink grant is also referred to as downlink assignment or downlink allocation.

The uplink grant is used for scheduling of a single PUSCH within a single cell. The uplink grant is used for the scheduling of a single PUSCH within a certain subframe. The downlink grant is used for the scheduling of a single PDSCH within a single cell. The downlink grant is used for the scheduling of the PDSCH within a subframe that is the same as the subframe in which the downlink grant is transmitted.

The D2D grant is used for scheduling of the PD2DDCH that is associated with the mode 1 for the D2D communication. That is, the D2D grant is used for the scheduling of the PD2DDCH, for the terminal device 1 which operates in the mode 1.

A Cyclic Redundancy Check (CRC) parity bit is attached to the DCI format. The CRC parity bit is scrambled by a Cell-Radio Network Temporary Identifier (C-RNTI), a Semi Persistent Scheduling Cell-Radio Network Temporary Identifier (SPS C-RNTI), or a D2D-Radio Network Temporary Identifier (D2D-RNTI). At this point, the C-RNTI, the SPS C-RNTI, and the D2D-RNTI are identifiers for identifying the terminal device 1 within a cell. The C-RNTI is used for controlling a resource for the PDSCH or a resource for the PUSCH within a single subframe. The SPSC-RNTI is used for periodically allocating a resource for the PDSCH or the PUSCH. The D2D-RNTI is used for transmission of the D2D grant. That is, the D2D-RNTI is used for the scheduling of the PD2DSCH for the D2D communication in the mode 1.

The PDSCH is used for transmitting downlink data (Downlink Shared Channel (DL-SCH)).

The PMCH is used for transmitting multicast data (Multicast Channel (MCH)).

In FIG. 1, the following downlink physical signals are used for the downlink wireless communication.

Synchronization signal (SS)
Downlink Reference Signal (DL RS)

The synchronization signal is used in order for the terminal device 1 to be synchronized to a frequency domain and a time domain for downlink. In the TDD scheme, the synchronization signal is mapped to subframes 0 and 5 within a radio frame.

The downlink reference signal is used in order for the terminal device 1 to perform the channel reconfiguration of the downlink physical channel. The downlink reference signal is used in order for the terminal device 1 to calculate downlink channel state information. The downlink reference signal is used in order for the terminal device 1 to measure a geographical location of the terminal device 1 itself.

According to the present embodiment, the following five types of downlink reference signals are used.

Cell-specific Reference Signal (CRS)
UE-specific Reference Signal (URS) that is associated with the PDSCH
Demodulation Reference Signal (DMRS) that is associated with the EPDCCH Non-Zero Power Chanel State Information-Reference Signal (NZP CSI-RS)

Zero Power Chanel State Information-Reference Signal (ZP CSI-RS)

Multimedia Broadcast and Multicast Service over Single Frequency Network Reference signal (MBSFN RS)

The CRS is transmitted in an entire band for a subframe. The CRS is used for performing demodulation of the PBCH/PDCCH/PHICH/PCFICH/PDSCH. The CRS may be used in order for the terminal device 1 to calculate the downlink channel state information. The PBCH/PDCCH/PHICH/PCFICH is transmitted on an antenna port that is used for the transmission of the CRS.

The URS that is associated with the PDSCH is transmitted in a subframe and a band that are used for transmission of the PDSCH with which the URS is associated. The URS is used for performing the demodulation of the PDSCH with which the URS is associated. The PDSCH is transmitted on an antenna port that is used for the transmission of the CRS or on antenna port that is used for transmission of the URS.

The DMRS that is associated with the EPDCCH is transmitted in a subframe and a band that are used for transmission of the EPDCCH with which the DMRS is associated. The DMRS is used for performing demodulation of the EPDCCH with which the DMRS is associated. The EPDCCH is transmitted on an antenna port that is used for transmission of the DMRS.

The NZP CSI-RS is transmitted in a subframe that is configured. A resource on which the NZP CSI-RS is transmitted is configured by the base station device 3. The NZP CSI-RS is used in order for the terminal device 1 to calculate the downlink channel state information. The terminal device 1 performs signal measurement (channel measurement) using the NZP CSI-RS.

A resource for the ZP CSI-RS is configured by the base station device 3. With a zero output, the base station device 3 transmits the ZP CSI-RS. More precisely, the base station device 3 does not transmit the ZP CSI-RS. The base station device 3 does not transmit the PDSCH and the EPDCCH on a resource that is configured for the ZP CSI-RS. For example, in a certain cell, the terminal device 1 can measure interference in a resource to which the NZP CSI-RS corresponds.

The MBSFN RS is transmitted in an entire band for a subframe that is used for transmission of the PMCH. The MBSFN RS is used for performing demodulation of the PMCH. The PMCH is transmitted on an antenna port that is used for transmission of the MBSFN RS.

The PSCH, the BCH, the MCH, the UL-SCH, and the DL-SCH are transport channels. A channel that is used in a Medium Access Control (MAC) layer is referred to as a transport channel. A unit of data for the transport channel that is used in the MAC layer is also referred to as a transport block (TB) or a MAC Protocol Data Unit (PDU). Control of a Hybrid Automatic Repeat reQuest (HARQ) is performed for every transport block in the MAC layer. The transport block is a unit of data that the MAC layer delivers to the physical layer. In the physical layer, the transport block is mapped to a codeword, and coding processing is performed on every codeword.

A structure of the radio frame according to the present embodiment is described.

In LTE, two structures of the radio frame are supported. The two structures of the radio frame are a frame structure type 1 and a frame structure type 2. The frame structure type 1 is applicable to FDD. The frame structure type 2 is applicable to TDD.

Figure 2:
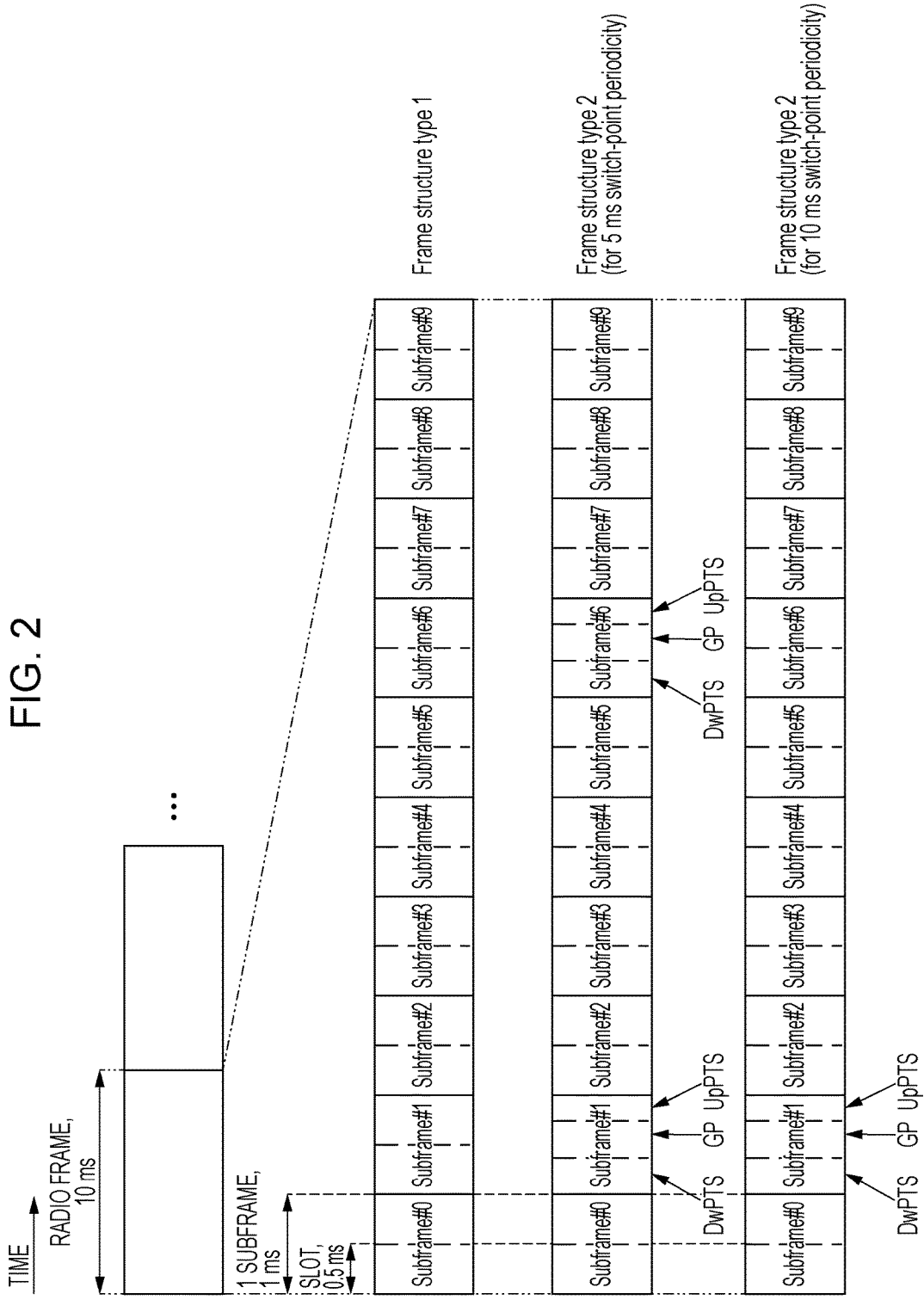
FIG. 2 is a diagram of a schematic constitution of a radio frame according to the present embodiment.

FIG. 2 is a diagram illustrating a schematic constitution of the radio frame according to the present embodiment. In FIG. 2, the horizontal axis is a time axis. Furthermore, each of a type 1 radio frame and a type 2 radio frame is 10 ms long, and is defined by 10 subframes. Each of the subframes is 1 ms long, and is defined by two consecutive slots. Each of the lots is 0.5 ms long. An i-th subframe within the radio frame is constituted from a (2×i)-th slot and a (2×i+1)-th slot.

The following three types of subframes are defined for frame structure type 2.
Downlink Subframe
Uplink Subframe
Special Subframe The downlink subframe is a subframe that is reserved for downlink transmission. The uplink subframe is a subframe that is reserved for uplink transmission. The special subframe is constituted from three fields. The three fields are a Downlink Pilot Time Slot (DwPTS), a Guard Period (GP), and an Uplink Pilot Time Slot (UpPTS). A sum of lengths of the DwPTS, the GP, and the UpPTS is 1 ms long. The DwPTS is a field that is reserved for the downlink transmission. The UpPTS is a field that is reserved for the uplink transmission. The GP is a field on which the downlink transmission and the uplink transmission are not performed. Moreover, the special subframe may be constituted only from the DwPTS and the GP, and may be constituted only from the GP and the UpPTS.

A radio frame of frame structure type 2 is constituted at least from the downlink subframe, the uplink subframe, and the special subframe.

A constitution of the slot according to the present embodiment is described.

Figure 3:
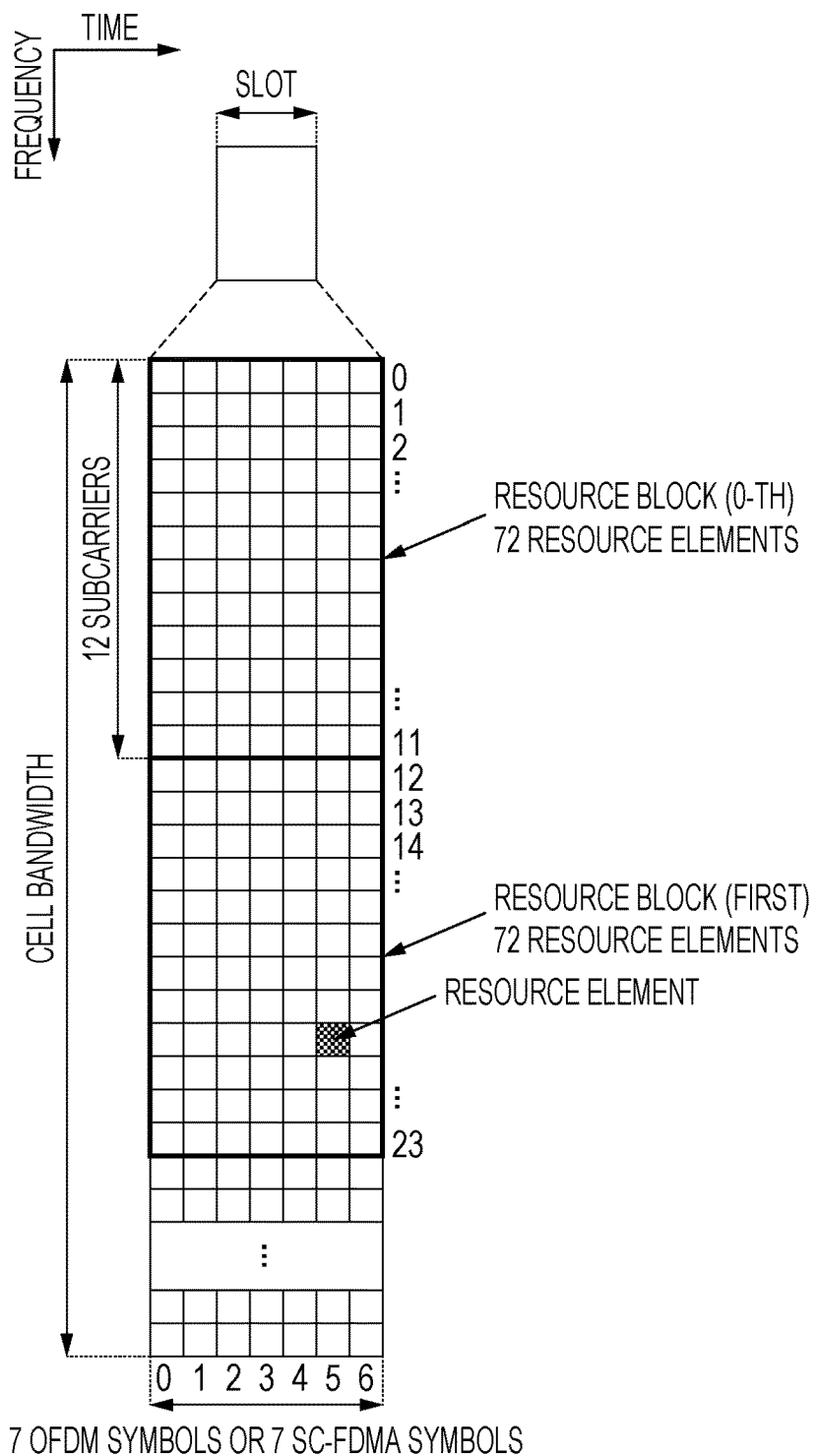
FIG. 3 is a diagram illustrating a constitution of a slot according to the present embodiment.

FIG. 3 is a diagram illustrating the constitution of the slot according to the present embodiment. In FIG. 3, a normal Cyclic Prefix (CP) applies to the OFDM symbol or an SC-FDMA symbol. The physical signal or the physical channel that is transmitted on each of the slots is expressed by a resource grid. In FIG. 3, the horizontal axis is a time axis and the vertical axis is a frequency axis. In a downlink, the resource grid is defined by multiple subcarriers and multiple OFDM symbols. In an uplink, the resource grid is defined by multiple subcarriers and multiple SC-FDMA symbols. For example, in the D2D link, the resource grid may be defined by multiple subcarriers and multiple SC-FDMA symbols. The number of subcarriers that constitute one slot depends on a cell bandwidth. The number of OFDM symbols or SC-FDMA symbols that constitute one slot is 7. Each of the elements within the resource grid is referred to as a resource element. The resource element is identified using a subcarrier number, and an OFDM symbol or SC-FDMA symbol number.

A resource block is used for expressing mapping of a certain physical channel (the PDSCH, the PUSCH, or the like) to resource elements. The resource block is defined by a virtual resource block and a physical resource block. A certain physical channel is first mapped to the virtual resource block. Thereafter, the virtual resource block is mapped to the physical resource block. One physical resource block is defined by 7 consecutive OFDM symbols or SC-FDMA symbols in the time domain and by 12 consecutive subcarriers in the frequency domain. Therefore, one physical resource block is constituted from (7×12) resource elements. Furthermore, one physical resource block corresponds to one slot in the time domain, and corresponds to 180 kHz in the frequency domain. The physical resource blocks are numbered from 0 in the frequency domain.

Moreover, an extended CP may apply to the OFDM symbol or the SC-FDMA symbol. In the case of the extended CP, the number of OFDM symbols or SC-FDMA symbols that constitute one slot is 7.

An arrangement of the physical channel and the physical signal according to the present embodiment is described.

Figure 4:
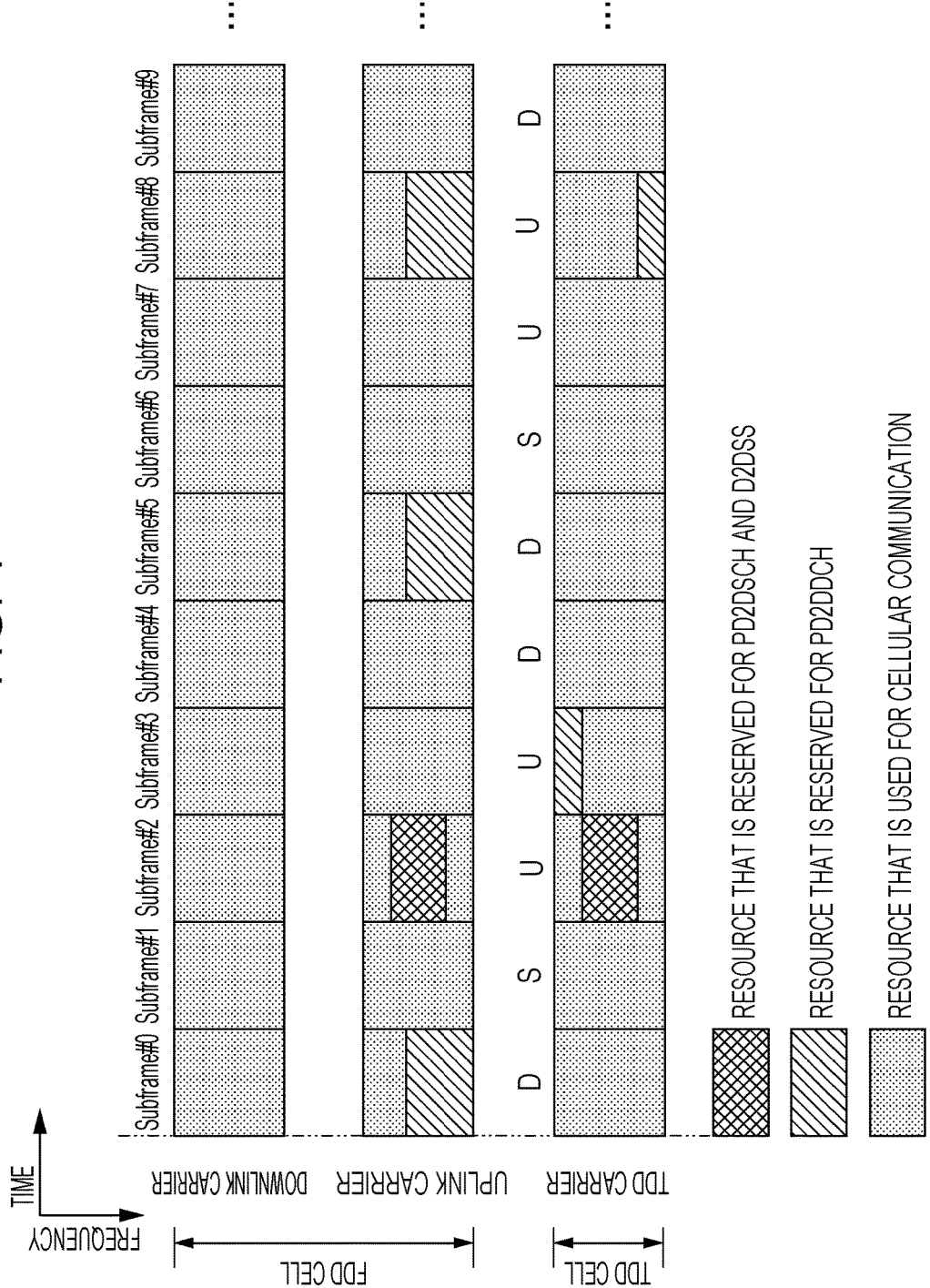
FIG. 4 is a diagram illustrating a D2D resource according to the present embodiment.

FIG. 4 is a diagram illustrating a D2D resource according to the present embodiment. A resource that is reserved for the D2D is referred to as the D2D resource. In FIG. 4, the horizontal axis is a time axis and the vertical axis is a frequency axis. In FIG. 4, D indicates a downlink subframe, S indicates a special subframe, and U indicates an uplink subframe. One FDD cell corresponds to one downlink carrier and one uplink carrier. One TDD cell corresponds to one TDD carrier.

In an FDD cell, the downlink signal that is used for the cellular communication is mapped to a subframe on a downlink carrier, the uplink signal that is used for the cellular communication is mapped to a subframe on an uplink carrier, and the D2D signal that is used for the D2D is mapped to a subframe on an uplink carrier. A carrier that corresponds to a cell in the downlink is referred to as a downlink component carrier. Furthermore, a carrier that corresponds to a cell in the uplink is referred to as an uplink component career. A TDD carrier is a downlink component carrier and is an uplink component carrier.

In a TDD cell, the downlink signal that is used for the cellular communication is mapped to the downlink subframe and the DwPTS, the uplink signal that is used for the cellular communication is mapped to the uplink subframe and the UpPTS, and the D2D signal that is used for the D2D is mapped to the uplink subframe and the UpPTS.

The base station device 3 controls the D2D resource that is reserved for the D2D. The base station device 3 reserves some of the resources on the uplink carrier in the TDD cell, as the D2D resource. The base station device 3 reserves some of the resources in the uplink subframe and the UpPTS in the TDD cell, as the D2D resource.

The base station device 3 may transmit a higher layer signal that includes information indicating a set (a pool) of D2D resources that are reserved in each of the cells, to the terminal device 1. The terminal device 1 sets a parameter, D2D-ResourceConfig, which indicates the D2D resource that is reserved for each of the cells, based on the higher layer signal that is received from the base station device 3. That is, the base station device 3 sets the parameter, D2D-ResourceConfig, which indicates the D2D resource that is reserved for each of the cells, for the terminal device 1 through the higher layer signal.

The PD2SCH and the D2DSS may be transmitted using 62 subcarriers in the vicinity of a center frequency of the uplink component carrier.

The base station device 3 may set one or multiple parameters indicating one or multiple sets of resources that are reserved for the D2D, for the terminal device 1 through the higher layer signal.

A set of resources for the PD2DSCH and the D2DSS and a set of resources that are reserved for the PD2DDCH may be dedicatedly controlled.

A set of resources for each of the type 1 of D2D discovery, the type 2 of D2D discovery, the mode 1 for the D2D communication, and the mode 2 for the D2D communication may be dedicatedly configured.

A set of resources for D2D transmission and reception may be dedicatedly configured.

Additionally, a set of resources for the PD2DDCH relating to the transmission of the D2D data, and a set of resources for the PD2DDCH relating to the transmission of the D2DSA may be dedicatedly configured.

From the perspective of the terminal device 1, among the sets of resources, which are described above, one or several sets of resources may be transparent. For example, because the PD2DDCH for the D2D data for the D2D communication is scheduled by the D2DSA, the terminal device 1 may not configure a set of resources for reception/monitoring of the PD2DDCH relating to the D2D data for the D2D communication.

In 3GPP, it has been considered that the D2D is used for Public Safety (PS). The base station device 3 may notify the terminal device 1 whether or not each of the sets of D2D resources is a set of resources for the PS. Furthermore, for the terminal device 1, the D2D for the PS may be authenticated through the EUTRAN. That is, the terminal device 1 for which the D2D for the PS is not authenticated has difficulty in performing the D2D with the set of resources for the PS.

A method of configuring a CP length according to the present embodiment is described.

The base station device 3 controls CP lengths in the uplink and the downlink. The base station device 3 may dedicatedly control the CP lengths in the uplink and downlink for every serving cell.

Based on the synchronization signal and/or the PBCH for a serving cell, the terminal device 1 detects a CP length of the downlink signal for the serving cell, with the exception of the PMCH and the MBSFN RS. The extended CP applies at all times to the PMCH and the MBSFN RS.

The base station device 3 transmits to the terminal device 1 the higher layer signal that includes information indicating a CP length of the uplink signal in the serving cell. The terminal device 1 sets a parameter, UL-CyclicPrefixLength, which indicates the CP length in the uplink in the serving cell, based on the higher layer signal that is received from the base station device 3. That is, the base station device 3 sets the parameter, UL-CyclicPrefixLength, which indicates the CP length in the uplink in the serving cell, for the terminal device 1 through the higher layer signal.

The base station device 3 may transmit to the terminal device 1 the higher layer signal that includes information indicating a CP length for the D2D. The terminal device 1 may set a parameter, D2D-CyclicPrefixLength, which indicates the CP length for the D2D, based on the higher layer signal that is received from the base station device 3. That is, the base station device 3 may set the parameter, D2D-CyclicPrefixLength, which indicates the CP length for the D2D, for the terminal device 1 through the higher layer signal.

CP lengths of the PD2DSCH and the D2DSS, and a CP length of the PD2DDCH may be dedicatedly configured.

A CP length for each of the type 1 of D2D discovery, the type 2 of D2D discovery, the mode 1 for the D2D communication, and the mode 2 for the D2D communication may be dedicatedly configured.

A CP length of the PD2DDCH relating to the transmission of the D2D data, and a CP length of the PD2DDCH relating to the transmission of the D2DSA may be dedicatedly configured.

That is, the CP lengths of the PD2DSCH and the D2DSS may be defined in advance with specifications or the like, and may be fixed. The CP length of the PD2DDCH relating to the transmission of the D2DSA may be defined in advance with specifications or the like, and may be fixed.

Figure 5:
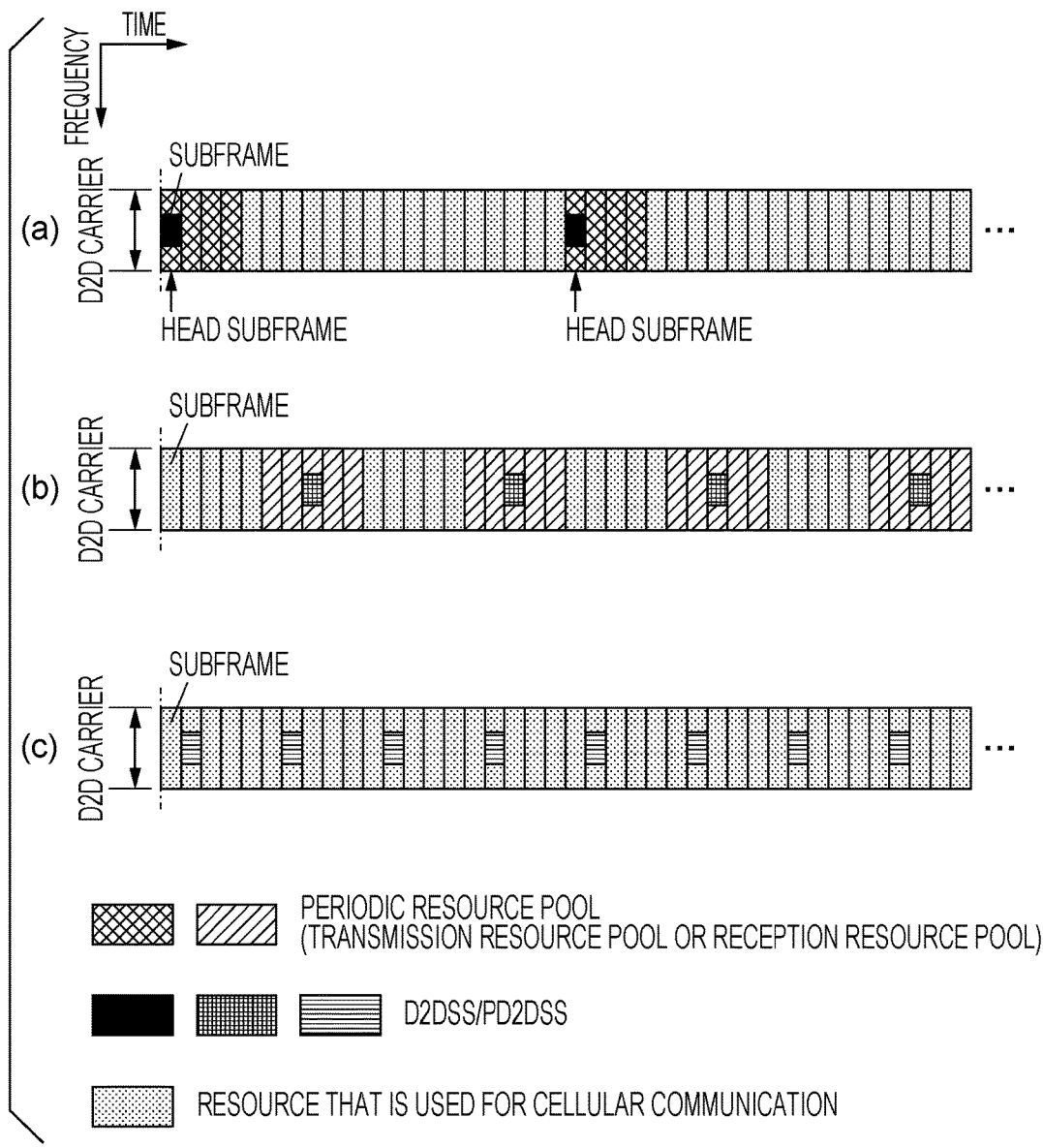
FIG. 5 is a diagram illustrating a method of transmitting a D2DSS/PD2DSCH according to the present embodiment.

FIG. 5 illustrates a method of transmitting the D2DSS/PD2DSCH. At this point, the D2DSS/PD2DSCH indicates the D2DSS/PD2DSCH. For example, the D2DSS/PD2DSCH is periodically transmitted in a subframe that is configured by the base station device 3.

FIG. 5(a) illustrates an example in which the D2DSS/PD2DSCH is periodically transmitted in a head subframe (or possibly one portion of the head subframe) within a periodic resource pool that is configured. At this point, in FIG. 5(a), the periodic resource pool that is configured may be configured for the D2D discovery. For example, as illustrated in FIG. 5(a), the D2DSS/PD2DSCH may be transmitted in the head subframe within the resource pool that is periodic (at internals of 20 subframes), which is configured for the D2D discovery. That is, a subframe for the transmission of the D2DSS/PD2DSCH may be configured in a state of being associated with a resource pool for the D2D discovery. Furthermore, the D2DSS/PD2DSCH that is transmitted in the subframe which is configured in a state of being associated with the resource pool for the D2D discovery may be the D2DSS/PD2DSCH for the D2D discovery.

At this point, in FIG. 5(a), the D2DSS/PD2DSCH is transmitted only in the head subframe within the resource pool that is periodic, which is configured, but may be transmitted in a subframe other than the head subframe. Furthermore, the D2DSS/PD2DSCH may be periodically transmitted in one resource pool among the resource pools that are periodic, which are configured. For example, a periodicity (for example, intervals of five subframes) may be configured for the transmission of the D2DSS/PD2DSCH, and, based on the configured periodicity, the D2DSS/PD2DSCH may be periodically transmitted in one resource pool. Furthermore, the D2DSS/PD2DSCH may be transmitted periodically (for example, at intervals of five subframes) in one resource pool among the resource pools that are periodic (for example, at intervals of 20 subframes), which are configured for the D2D discovery.

At this point, on this occasion, a transmission periodicity for the transmission of the D2DSS/PD2DSCH may be configured in a state where a resource (a subframe) that is used for the cellular communication is included. Furthermore, on this occasion, the transmission periodicity for the D2DSS/PD2DSCH may be configured considering only a subframe within one resource pool.

As is described with reference to FIG. 5(a), the D2DSS/PD2DSCH (for example, the D2DSS/PD2DSCH that is transmitted in the head subframe within the periodic resource pool that is configured for the D2D discovery) will be also expressed below as a first D2DSS/first PD2DSCH. For example, the base station device 3 may control transmission of the first D2DSS/first PD2DSCH using first information (a first parameter) that is included in the higher layer signal.

FIG. 5(b) illustrates an example in which the D2DSS/PD2DSCH is periodically transmitted in a subframe within the periodic resource pool that is configured. At this point, in FIG. 5(b), the perietic resource pool that is configured may be configured for the D2D communication. For example, as illustrated in FIG. 5(b), the D2DSS/PD2DSCH may be transmitted in the subframe within the resource pool that is periodic (at internals of 10 subframes), which is configured for the D2D communication. That is, the subframe for the transmission of the D2DSS/PD2DSCH may be configured in a state of being associated with a resource pool for the D2D communication. Furthermore, the D2DSS/PD2DSCH that is transmitted in the subframe which is configured in a state of being associated with the resource pool for the D2D communication may be the D2DSS/PD2DSCH for the D2D communication.

As is described with reference to FIG. 5(b), the D2DSS/PD2DSCH (for example, the D2DSS/PD2DSCH that is transmitted in the subframe within the periodic resource pool that is configured for the D2D communication) will be also expressed below as a second D2DSS/second PD2DSCH. For example, the base station device 3 may control transmission of the second D2DSS/second PD2DSCH using second information (a second parameter) that is included in the higher layer signal. For example, by configuring the periodicity for or an offset for the transmission of the D2DSS/PD2DSCH, the base station device 3 may perform an instruction on which subframe within the periodic resource pool that is configured for the D2D communication the D2DSS/PD2DSCH is transmitted in. Furthermore, as will be described below, the transmission of the second D2DSS/second PD2DSCH may be included in transmission of a fourth D2DSS/fourth PD2DSCH.

FIG. 5(c) illustrates an example in which the D2DSS/PD2DSCH is periodically transmitted in the periodic subframe that is configured. That is, FIG. 5(c) illustrates an example in which the subframe for the transmission of the D2DSS/PD2DSCH is configured without being associated with the resource pool (the resource pool for the D2D discovery and/or the resource pool for the D2D communication). For example, as illustrated in FIG. 5(c), the D2DSS/PD2DSCH may be transmitted in the subframe that is periodic (at intervals of five subframes), which is configured. At this point, the D2DSS/PD2DSCH that is transmitted in the configured subframe without being associated with the resource pool (the resource pool for the D2D discovery and/or the resource pool for the D2D communication) may be the D2DSS/PD2DSCH for the D2D communication.

As is described with reference to FIG. 5(c), the D2DSS/PD2DSCH (for example, the D2DSS/PD2DSCH that is transmitted in the periodic subframe that is configured) will be also expressed below as a third D2DSS/third PD2DSCH. For example, the base station device 3 may control transmission of the third D2DSS/third PD2DSCH using third information (a third parameter) that is included in the higher layer signal. For example, by configuring the transmission periodicity for or the offset for the D2DSS/PD2DSCH, the base station device 3 may perform an instruction on the subframe for the periodic transmission of the D2DSS/PD2DSCH. Furthermore, if the subframe on which the instruction is performed by the base station device 3 is the subframe within a resource pool that is configured for the D2D communication, the terminal device 1 may transmit the D2DSS/PD2DSCH. Furthermore, as will be described below, the transmission of the third D2DSS/third PD2DSCH may be included in the transmission of the fourth D2DSS/fourth PD2DSCH.

In the following description, the transmission of the fourth D2DSS/fourth PD2DSCH includes at least any one of the transmission of the second D2DSS/second PD2DSCH and the transmission of the third D2DSS/third PD2DSCH. For example, the base station device 3 may control the transmission of the fourth D2DSS/fourth PD2DSCH using fourth information (a fourth parameter) that is included in the higher layer signal. That is, the fourth information (the fourth parameter) includes at least any one of the second information (the second parameter) and the third information (the third parameter).

As described above, the D2DSS/PD2DSCH may be transmitted as described with reference to FIGS. 5(a), 5(b), and 5(c). For example, the base station device 3 may be configured in such a manner that the D2DSS/PD2DSCH is transmitted using the transmission method that is described with reference to FIG. 5(a), and the communication method that is described with reference to FIG. 5(b). Furthermore, the base station device 3 may be configured in such a manner that the D2DSS/PD2DSCH is transmitted using the transmission method that is described with reference to FIG. 5(a), and the communication method that is described with reference to FIG. 5(c). At this point, for the D2D discovery and the D2D communication, one D2DSS/PD2DSCH may be transmitted.

A first example in which, for the transmission of the first D2DSS/first PD2DSCH, and the transmission of the fourth D2DSS/fourth PD2DSCH, one common CP length is configured will be described below.

For example, for the transmission of the first D2DSS/first PD2DSCH, and the transmission of the fourth D2DSS/fourth PD2DSCH, one CP length (a parameter relating to the CP length) may be defined. That is, the base station device 3 may configure one CP length for the transmission of the first D2DSS/first PD2DSCH, and the transmission of the fourth D2DSS/fourth PD2DSCH. Furthermore, the terminal device 1 may transmit the first D2DSS/first PD2DSCH, and the fourth D2DSS/fourth PD2DSCH, using one common CP length that is configured.

At this point, a CP length that is configured for the D2D discovery may be used as one CP length that is configured for the transmission of the first D2DSS/first PD2DSCH and the transmission of the fourth D2DSS/fourth PD2DSCH. For example, a parameter relating to the CP length that is configured for the D2D discovery may be used for configuration of the CP length for the transmission of the first D2DSS/first PD2DSCH and the CP length for the transmission of the fourth D2DSS/fourth PD2DSCH.

Furthermore, a CP length for the D2D communication may be used as one CP length that is configured for the transmission of the first D2DSS/first PD2DSCH, and the transmission of the fourth D2DSS/fourth PD2DSCH. For example, a parameter relating to the CP length for the D2D communication may be used for the configuration of the CP length for the transmission of the first D2DSS/first PD2DSCH and the CP length for the transmission of the fourth D2DSS/fourth PD2DSCH.

Furthermore, of the CP length that is configured for the D2D discovery and a CP length that is configured for the D2D communication, the longer CP length (the larger size CP length) may be used as one CP length that is configured for the transmission of the first D2DSS/first PD2DSCH and the transmission of the fourth D2DSS/fourth PD2DSCH. That is, the terminal device 1 may compare the CP length that is configured for the D2D discovery and the CP length that is configured for the D2D communication, with each other, and, using the longer CP length, may transmit the first D2DSS/first PD2DSCH, and the fourth D2DSS/fourth PD2DSCH. For example, a CP length that is configured by a parameter relating to the CP length for the D2D discovery, and a CP length that is configured by the parameter relating to the CP length for the D2D communication are compared with each other, the longer CP length may be used for the transmission of the first D2DSS/first PD2DSCH and the fourth D2DSS/fourth PD2DSCH.

At this point, in a case where the CP length that is configured for the D2D discovery and the CP length that is configured for the D2D communication are the same lengths, the first D2DSS/first PD2DSCH and the fourth D2DSS and fourth PD2DSCH may be transmitted using that CP length. Furthermore, in a case where the CP length that is configured for the D2D discovery and the CP length that is configured for the D2D communication are different lengths, the CP length that is configured for the D2D discovery and the CP length that is configured for the D2D communication may be compared with each other, and the first D2DSS/first PD2DSCH and the fourth D2DSS/fourth PD2DSCH may be transmitted using a longer CP length.

The CP length that is configured for the D2D discovery and the CP length that is configured for the D2D communication are described above as being compared with each other, and the longer CP length is described above as being used as a CP length that is used for the transmission of the first D2DSS/first PD2DSCH and the fourth D2DSS/fourth PD2DSCH, but at this point, of course, the shorter CP length may be used instead. For example, which of the longer CP length and the shorter CP length is used is stipulated by specifications or the like.

A second example in which, for each of the transmission of the first D2DSS/first PD2DSCH, and the transmission of the fourth D2DSS/fourth PD2DSCH, the CP length is dedicatedly configured will be described below.

For example, for each of the transmission of the first D2DSS/first PD2DSCH, and the transmission of the fourth D2DSS/fourth PD2DSCH, a dedicated CP length (the parameter relating to the CP length) may be defined. That is, the base station device 3 may configure the CP length dedicatedly for each of the transmission of the first D2DSS/first PD2DSCH, and the transmission of the fourth D2DSS/fourth PD2DSCH. Furthermore, the terminal device 1 may transmit the first D2DSS/first PD2DSCH using a CP length that is configured for the transmission of the first D2DSS/first PD2DSCH, and may transmit the fourth D2DSS/fourth PD2DSCH using a CP length that is configured for the fourth D2DSS/fourth PD2DSCH.

At this point, for the transmission of the first D2DSS/first PD2DSCH, the CP length that is configured for the D2D discovery may be used. Furthermore, for the transmission of the fourth D2DSS/fourth PD2DSCH, the CP length that is configured for the D2D communication may be used. For example, the parameter relating to the CP length that is configured for the D2D discovery may be used for the CP length for the transmission of the first D2DSS/first PD2DSCH. Furthermore, a parameter relating to the CP length that is configured for the D2D communication may be used for the configuration of the CP length for the transmission of the fourth D2DSS/fourth PD2DSCH.

At this point, the base station device 3 may switch between the method of configuring the CP length, which is described as the first example, and the method of configuring the CP length, which is described as the second example. For example, the base station device 3 may transmit information for indicating any one of the method of configuring the CP length, which is described as the first example, and the method of configuring the CP length, which is described as the second example, in a state of being included in the higher layer signal.

At this point, in the first example and/or the second example, the first D2DSS/first PD2DSCH may be transmitted using a CP length that is configured for transmission (transmission on the PD2DDCH) on the PSCH for the D2D discovery. For example, based on a parameter relating to the CP length that is configured for the transmission (the transmission on the PD2DDCH) on the PSCH for the D2D discovery, the first D2DSS/first PD2DSCH may be transmitted in the head subframe (or possible an arbitrary subframe within a resource pool that is configured for transmission for the D2D discovery) within the periodic resource pool that is configured.

Furthermore, in the first example and/or the second example, the fourth D2DSS/fourth PD2DSCH may be transmitted using a CP length that is configured for the transmission (the transmission on the PD2DDCH) on the PSCH for the D2D communication. Furthermore, in the first example and/or the second example, the fourth D2DSS/fourth PD2DSCH may be transmitted using a CP length that is configured for the transmission (the transmission on the PD2DDCH) with the D2DSA for the D2D communication. At this point, the CP length may be dedicatedly configured for each of the transmission (the transmission on the PD2DDCH) on the PSCH for the D2D communication and the transmission (the transmission on the PD2DDCH) on the PSCH for the D2D communication.

Furthermore, in a case where, in the first example and/or the second example, the CP length that is configured for the transmission (the transmission on the PD2DDCH) on the PSCH for the D2D communication, and the CP length that is configured for the transmission (the transmission on the PD2DDCH) on the PSCH for the D2D communication are the same lengths, the fourth D2DSS/fourth PD2DSCH may be transmitted using that CP length. Furthermore, in a case where, in the first example and/or the second example, the CP length that is configured for the transmission (the transmission on the PD2DDCH) on the PSCH for the D2D communication, and the CP length that is configured for the transmission (the transmission on the PD2DDCH) on the PSCH for the D2D communication are different lengths, the CP length that is configured for the transmission (the transmission on the PD2DDCH) on the PSCH for the D2D communication and the CP length that is configured for the transmission (the transmission on the PD2DDCH) on the PSCH for the D2D communication may be compared with each other, and the fourth D2DSS/fourth PD2DSCH may be transmitted using a longer CP length (the larger size CP length) or a shorter CP length (the smaller size CP length).

That is, based on a parameter relating to the CP length that is configured for the transmission (the transmission on the PD2DDCH) on the PSCH for the D2D communication, and/or a parameter relating to the CP length that is configured for the transmission (the transmission on the PD2DDCH) with the D2DSA for the D2D communication, the fourth D2DSS/fourth PD2DSCH may be periodically transmitted in the configured subframe (or possibly an arbitrary subframe within a resource pool that is configured for transmission for the D2D communication).

As the example of configuring the CP length that is used for the transmission of the first D2DSS/first PD2DSCH and the fourth D2DSS/fourth PD2DSCH, the CP length that is configured for the D2D discovery and the CP length that is configured for the D2D communication are described above as being compared with each other, and the longer CP length is described above as being used. An example in which the CP length that is used for the transmission of the first D2DSS/first PD2DSCH and the fourth D2DSS/fourth PD2DSCH is configured based on a priority level in terms of a mode for the D2D communication and/or a type of D2D discovery will be described below.

One example will be described below in which the CP length is dedicatedly configured for each of the type 1 of D2D discovery, the type 2 of D2D discovery (a type 2A and a type 2B), a D2D communication mode 1, and, a D2D communication mode 2, and in which based on the priority level, a CP length that is used for the transmission of the first D2DSS/first PD2DSCH and the transmission of the fourth D2DSS/fourth PD2DSCH is configured. At this point, the following description is one example, and, of course, the present embodiment includes the same contents as will be described below, in their entireties. For example, the priority level is stipulated in advance in specifications and the like.

For example, in a case where, in terms of the priority level, it is stipulated that the D2D communication mode 1 has a higher priority level than the type 2 of D2D discovery, the type 2 of D2D discovery has a higher priority level than the D2D communication mode 2, and the D2D communication mode 2 has a higher priority level than the type 1 of D2D discovery, if the mode 1 is configured as the mode for the D2D communication and the type 2 is configured as the type of D2D discovery, a CP length that is configured for the D2D communication mode 1 is used for the transmission of the first D2DSS/first PD2DSCH and the transmission of the fourth D2DSS/fourth PD2DSCH. Furthermore, if the mode 2 is configured as the mode for the D2D communication and the type 2 is configured as the type of the D2D discovery, a CP length that is configured for the type 2 of D2D discovery is used for the transmission of the first D2DSS/first PD2DSCH and the transmission of the fourth D2DSS/fourth PD2DSCH.

That is, the CP length that is used for the transmission of the first D2DSS/first PD2DSCH and the transmission of the fourth D2DSS/fourth PD2DSCH may be configured based on a priority level of the mode for the D2D communication and/or the type of D2D discovery, which is stipulated in advance.

At this point, in a case where contention occurs between the transmission of the first D2DSS/first PD2DSCH and the transmission of the fourth D2DSS/fourth PD2DSCH, the priority level of the mode for the D2D communication and/or the type of D2D discovery may be used for determining which D2DSS/PD2DSCH is transmitted. That is, in the same subframe, if the transmission of the first D2DSS/first PD2DSCH and the transmission of the fourth D2DSS/fourth PD2DSCH occur, any one D2DSS/PD2DSCH may be transmitted base on the priority level.

For example, in a case where the priority level described above is stipulated, if the mode 1 is configured as the mode for the D2D communication, the type 2 is configured as the type of the D2D discovery, and the transmission of the first D2DSS/first PD2DSCH and the transmission of the fourth D2DSS/fourth PD2DSCH occur in the same subframe, only the fourth D2DSS/fourth PD2DSCH may be transmitted in the same frame. At this point, the CP length that is used for the transmission of the fourth D2DSS/fourth PD2DSCH may be a CP that is configured for the D2D communication mode 1, based on the priority level.

That is, based on the priority level, only the fourth D2DSS/fourth PD2DSCH (the fourth D2DSS/fourth PD2DSCH that is configured for the D2D communication) that corresponds to the D2D communication may be transmitted. That is, the first D2DSS/first PD2DSCH (the first D2DSS/first PD2DSCH that is configured for the D2D discovery) that corresponds to the D2D discovery is dropped (the transmission of the first D2DSS/first PD2DSCH is dropped).

Furthermore, in the case where the priority level described above is stipulated, if the mode 2 is configured as the mode for the D2D communication, the type 2 is configured as the type of the D2D discovery, and the transmission of the first D2DSS/first PD2DSCH and the transmission of the fourth D2DSS/fourth PD2DSCH occur in the same subframe, only the first D2DSS/first PD2DSCH may be transmitted in the same frame. At this point, the CP length that is used for the transmission of the first D2DSS/first PD2DSCH may be a CP that is configured for the type 2 of D2D discovery, based on the priority level.

That is, based on the priority level, only the first D2DSS/first PD2DSCH (the first D2DSS/first PD2DSCH that is configured for the D2D discovery) that corresponds to the D2D discovery may be transmitted. That is, the fourth D2DSS/fourth PD2DSCH (the fourth D2DSS/fourth PD2DSCH that is configured for the D2D communication) that corresponds to the D2D communication is dropped (the transmission of the fourth D2DSS/fourth PD2DSCH is dropped).

A method of configuring a transmit power will be described.

At this point, for at least the terminal device 1A in coverage, transmit power control as expressed in the following expression may apply to the transmission (the transmission on the PD2DDCH) with the D2DSA and on the PSCH. That is, the transmit power (a value of the transmit power) that is calculated based Math. 1 may be applied to the transmission (the transmission on the PD2DDCH) with the D2DSA and on the PSCH.

[Math. 1]

$$P_{D2D}(i) = \min \left\{ \begin{array}{l} P_{CMAX,c}(f), \\ 10\log_{10}(M_{D2D}(i)) + P_{O\_D2D} + \alpha_{D2D} \cdot PL_c + f_{D2D}(i) \end{array} \right\} \text{[dBm]} \quad (1)$$

At this point, $P_{D2D}(i)$ is a transmit power (the value of the transmit power) for the transmission (the transmission on the PD2DDCH) with the D2DSA and on the PSCH by the terminal device 1 in subframe i. Furthermore, $P_{CMAX,c}$ is a maximum transmit power in a serving cell c. Furthermore, $M_{D2D}(i)$ is the number of resource blocks that are scheduled for the transmission (the transmission on the PD2DDCH) with the D2DSA and on the PSCH. Furthermore, $P_{O\_D2D}$ is a power that results from adding up a nominal target power that is configurable in a cell-specific manner and a UE-specific power offset. Furthermore, $\alpha_{D2D}$ is a path loss compensation factor in fractional TPC. Furthermore, $PL_c$ is a path loss between the base station device 3 and the terminal device 1 in the serving cell c. Furthermore, $f_{D2D}(i)$ is based on a TPC command that is transmitted through the PDCCH.

At this point, $P_{O\_D2D}$ may be the nominal target power that is configurable in a cell-specific manner. Furthermore, $PL_c$ is a path loss (a path loss between the terminal devices 1) in the D2D link. Furthermore, $PL_c$ is a path loss from the synchronization source on which the D2DSS is transmitted. As described above, the synchronization source is the base station device or the terminal device 1.

$P_{O\_D2D}$ and/or $\alpha_{D2D}$ are hereinafter also expressed as a parameter relating to the transmit power.

At this point, each of a parameter relating to a transmit power for the D2D discovery, and a parameter for a transmit power for the D2D communication may be dedicatedly configured. Furthermore, a parameter relating to a transmit power for the type 1 of D2D discovery, a parameter relating to a transmit power for the type 2 of D2D discovery, a parameter relating to a transmit power for the D2D communication mode 1, and a parameter relating to a transmit power for the D2D communication mode 2 may be dedicatedly configured.

Furthermore, a parameter relating to one common transmit power may be configured as a parameter relating to a transmit power for the transmission (the transmission on the PD2DDCH) on the PSCH for the D2D communication, and a parameter relating to a transmit power for the transmission (the transmission on the PD2DDCH) with the D2DSA for the D2D communication. Furthermore, the parameter relating to the transmit power for the transmission (the transmission on the PD2DDCH) on the PSCH for the D2D communication, and the parameter relating to the transmit power for the transmission (the transmission on the PD2DDCH) with the D2DSA for the D2D communication may be dedicatedly configured.

Furthermore, a parameter relating to a transmit power for the PD2DSCH and the D2DSS and a parameter relating to a transmit power for the PD2DDCH may be dedicatedly configured.

For example, the base station device 3 may transmit the parameter (information for configuring the parameter relating to the transmit power) relating to the transmit power described above, in a state of being included in the higher layer signal.

A third example in which, for the transmission of the first D2DSS/first PD2DSCH, and the transmission of the fourth D2DSS/fourth PD2DSCH, one common transmit power is configured will be described below.

For example, for the transmission of the first D2DSS/first PD2DSCH, and the transmission of the fourth D2DSS/fourth PD2DSCH, one transmit power (the parameter relating to the transmit power) may be defined. That is, the base station device 3 may configure one transmit power for the transmission of the first D2DSS/first PD2DSCH, and the transmission of the fourth D2DSS/fourth PD2DSCH. Furthermore, the terminal device 1 may transmit the first D2DSS/first PD2DSCH, and the fourth D2DSS/fourth PD2DSCH, using one common transmit power that is configured.

At this point, a transmit power that is configured for the D2D discovery may be used as one CP length that is configured for the transmission of the first D2DSS/first PD2DSCH and the transmission of the fourth D2DSS/fourth PD2DSCH. For example, a parameter relating to the transmit power that is configured for the D2D discovery may be used for configuration of a transmit power for the transmission of the first D2DSS/first PD2DSCH and a transmit power for the transmission of the fourth D2DSS/fourth PD2DSCH.

Furthermore, the transmit power for the D2D communication may be used as one transmit power that is configured for the transmission of the first D2DSS/first PD2DSCH, and the transmission of the fourth D2DSS/fourth PD2DSCH. For example, the parameter relating to the transmit power for the D2D communication may be used for the configuration of the transmit power for the transmission of the first D2DSS/first PD2DSCH and the transmit power for the transmission of the fourth D2DSS/fourth PD2DSCH.

Furthermore, of the transmit power that is configured for the D2D discovery and a transmit power that is configured for the D2D communication, the higher transmit power (the larger size transmit power) may be used as one transmit power that is configured for the transmission of the first D2DSS/first PD2DSCH and the transmission of the fourth D2DSS/fourth PD2DSCH. That is, the terminal device 1 may compare the transmit power that is configured for the D2D discovery and the transmit power that is configured for the D2D communication, with each other, and, using the higher transmit power, may transmit the first D2DSS/first PD2DSCH, and the fourth D2DSS/fourth PD2DSCH. For example, a transmit power that is configured using the parameter relating to the transmit power for the D2D discovery, and a transmit power that is configured using the parameter relating to the transmit power for the D2D communication are compared with each other, the higher transmit power may be used for the transmission of the first D2DSS/first PD2DSCH and the fourth D2DSS/fourth PD2DSCH.

For example, the terminal device 1 compares a transmit power per resource block, which is calculated from a parameter relating to a transmit power that is configured for the D2D discovery and a transmit power per resource block, which is calculated from a parameter relating to a transmit power that is configured for the D2D communication, with each other, and the first D2DSS/first PD2DSCH and the fourth D2DSS/fourth PD2DSCH may be transmitted using the higher transmit power (the transmit power per resource block).

At this point, one common path loss (an estimation value of the path loss) is used for calculating the transmit power that is configured for the D2D discovery, and calculating the transmit power that is configured for the D2D communication. For example, a path loss (the estimation value of the path loss) between the base station device 3 and the terminal device 1 may be used as one common path loss (the estimation value of the path loss) for calculating the transmit power that is configured for the D2D discovery and calculating the transmit power that is configured for the D2D communication. For example, in a case where the mode 1 is configured as the mode for the D2D communication, the path loss (the estimation value of the path loss) between the base station device 3 and the terminal device 1 may be used as one common path loss (the estimation value of the path loss) for calculating the transmit power that is configured for the D2D discovery and calculating the transmit power that is configured for the D2D communication.

Furthermore, a path loss (the estimation value of the path loss) between the terminal devices 1 may be used as one common path loss (the estimation value of the path loss) for calculating the transmit power that is configured for the D2D discovery and calculating the transmit power that is configured for the D2D communication. For example, in the case where the mode 2 is configured as the mode for the D2D communication, the path loss (the estimation value of the path loss) between the terminal devices 1 may be used as one common path loss (the estimation value of the path loss) for calculating the transmit power that is configured for the D2D discovery and calculating the transmit power that is configured for the D2D communication.

At this point, in a case where the transmit power that is configured for the D2D discovery and the transmit power that is configured for the D2D communication are at the same value, the first D2DSS/first PD2DSCH and the fourth D2DSS and fourth PD2DSCH may be transmitted using that transmit power (the value of the transmit power). Furthermore, in a case where the transmit power that is configured for the D2D discovery and the transmit power that is configured for the D2D communication are at different values, the transmit power that is configured for the D2D discovery and the transmit power that is configured for the D2D communication may be compared with each other, and the first D2DSS/first PD2DSCH and the fourth D2DSS/fourth PD2DSCH may be transmitted using a higher transmit power.

The transmit power that is configured for the D2D discovery and the transmit power that is configured for the D2D communication are described above as being compared with each other, and the higher transmit power is described above as being used as a transmit power that is used for the transmission of the first D2DSS/first PD2DSCH and the fourth D2DSS/fourth PD2DSCH, but at this point, of course, the lower transmit power may be used instead. For example, which of the higher transmit power and the lower transmit power is used is stipulated by specifications or the like.

A fourth example in which, for each of the transmission of the first D2DSS/first PD2DSCH, and the transmission of the fourth D2DSS/fourth PD2DSCH, the transmit power is dedicatedly configured will be described below.

For example, a dedicated transmit power (the parameter relating to the transmit power) may be defined for each of the transmission of the first D2DSS/first PD2DSCH and the transmission of the fourth D2DSS/fourth PD2DSCH. That is, the base station device 3 may configure the transmit power dedicatedly for each of the transmission of the first D2DSS/first PD2DSCH, and the transmission of the fourth D2DSS/fourth PD2DSCH. Furthermore, the terminal device 1 may transmit the first D2DSS/first PD2DSCH using a transmit power that is configured for the transmission of the first D2DSS/first PD2DSCH, and may transmit a fourth D2DSS/fourth PD2DSCH using the transmit power that is configured for the fourth D2DSS/fourth PD2DSCH.

At this point, for the transmission of the first D2DSS/first PD2DSCH, the transmit power that is configured for the D2D discovery may be used. Furthermore, for the transmission of the fourth D2DSS/fourth PD2DSCH, the transmit power that is configured for the D2D communication may be used. For example, the parameter relating to the transmit power that is configured for the D2D discovery may be used for the transmit power for the transmission of the first D2DSS/first PD2DSCH. Furthermore, a parameter relating to the transmit power that is configured for the D2D communication may be used for the configuration of the transmit power for the transmission of the fourth D2DSS/fourth PD2DSCH.

At this point, as described above, one common path loss (the estimation value of the path loss) is used for calculating the transmit power that is configured for the D2D discovery, and calculating the transmit power that is configured for the D2D communication. For example, the path loss (the estimation value of the path loss) between the base station device 3 and the terminal device 1 may be used as one common path loss (the estimation value of the path loss) for calculating the transmit power that is configured for the D2D discovery and calculating the transmit power that is configured for the D2D communication. Furthermore, the path loss (the estimation value of the path loss) between the terminal devices 1 may be used as one common path loss (the estimation value of the path loss) for calculating the transmit power that is configured for the D2D discovery and calculating the transmit power that is configured for the D2D communication.

At this point, the base station device 3 may switch between the method of configuring the transmit power, which is described as the third example, and the method of configuring the transmit power, which is described as the fourth example. For example, the base station device 3 may transmit information for indicating any one of the method of configuring the transmit power, which is described as the third example, and the method of configuring the transmit power, which is described as the fourth example, in a state of being included in the higher layer signal.

At this point, in the third example and/or the fourth example, the first D2DSS/first PD2DSCH may be transmitted using a transmit power that is configured for the transmission (the transmission on the PD2DDCH) on the PSCH for the D2D discovery. For example, based on a parameter relating to the transmit power that is configured for the transmission (the transmission on the PD2DDCH) on the PSCH for the D2D discovery, the first D2DSS/first PD2DSCH may be transmitted in the head subframe (or possible an arbitrary subframe within the resource pool that is configured for the transmission for the D2D discovery) within the periodic resource pool that is configured.

Furthermore, in the third example and/or the fourth example, the fourth D2DSS/fourth PD2DSCH may be transmitted using a transmit power that is configured for the transmission (the transmission on the PD2DDCH) on the PSCH for the D2D communication. Furthermore, in the third example and/or the fourth example, the fourth D2DSS/fourth PD2DSCH may be transmitted using a transmit power that is configured for the transmission (the transmission on the PD2DDCH) with the D2DSA for the D2D communication. At this point, as described above, the transmit power may be dedicatedly configured for each of the transmission (the transmission on the PD2DDCH) on the PSCH for the D2D communication and the transmission (the transmission on the PD2DDCH) on the PSCH for the D2D communication.

Furthermore, in a case where, in the third example and/or the fourth example, the transmit power that is configured for the transmission (the transmission on the PD2DDCH) on the PSCH for the D2D communication, and the transmit power that is configured for the transmission (the transmission on the PD2DDCH) on the PSCH for the D2D communication are at the same value, the fourth D2DSS/fourth PD2DSCH may be transmitted using that transmit power (the value of the transmit power). Furthermore, in a case where, in the third example and/or the fourth example, the transmit power that is configured for the transmission (the transmission on the PD2DDCH) on the PSCH for the D2D communication, and the transmit power that is configured for the transmission (the transmission on the PD2DDCH) on the PSCH for the D2D communication are at different values, the transmit power that is configured for the transmission (the transmission on the PD2DDCH) on the PSCH for the D2D communication and the transmit power that is configured for the transmission (the transmission on the PD2DDCH) on the PSCH for the D2D communication may be compared with each other, and the fourth D2DSS/fourth PD2DSCH may be transmitted using a higher transmit power (the larger size transmit power) or a transmit power with a shorter CP length (the smaller size CP length).

That is, based on a parameter relating to the transmit power that is configured for the transmission (the transmission on the PD2DDCH) on the PSCH for the D2D communication, and/or a parameter relating to the transmit power that is configured for the transmission (the transmission on the PD2DDCH) with the D2DSA for the D2D communication, the fourth D2DSS/fourth PD2DSCH may be periodically transmitted in the configured subframe (or possibly an arbitrary subframe within the resource pool that is configured for the transmission for the D2D communication).

As the example of configuring the transmit power that is used for the transmission of the first D2DSS/first PD2DSCH and the fourth D2DSS/fourth PD2DSCH, the transmit power that is configured for the D2D discovery and the transmit power that is configured for the D2D communication are described above as being compared with each other, and the higher transmit power is described above as being used. An example in which the transmit power that is used for the transmission of the first D2DSS/first PD2DSCH and the fourth D2DSS/fourth PD2DSCH is configured based on the priority level in terms of the mode for the D2D communication and/or the type of D2D discovery will be described below.

One example will be described below in which the transmit power is dedicatedly configured for each of the D2D discovery type 1, the type 2 of D2D discovery (the type 2A and the type 2B), the D2D communication mode 1, and, the D2D communication mode 2, and in which based on the priority level, a transmit power that is used for the transmission of the first D2DSS/first PD2DSCH and the transmission of the fourth D2DSS/fourth PD2DSCH is configured. At this point, the following description is one example, and, of course, the present embodiment includes the same contents as will be described below, in their entireties. For example, the priority level is stipulated in advance in specifications and the like.

For example, in the case where, in terms of the priority level, it is stipulated that the D2D communication mode 1 has a higher priority level than the type of D2D discovery, the type 2 of D2D discovery has a higher priority level than the D2D communication mode 2, and the D2D communication mode 2 has a higher priority level than the type 2 of D2D discovery, if the mode 1 is configured as the mode for the D2D communication and the type 2 is configured as the type 1 of D2D discovery, a transmit power that is configured for the D2D communication mode 1 is used for the transmission of the first D2DSS/first PD2DSCH and the transmission of the fourth D2DSS/fourth PD2DSCH. Furthermore, if the mode 2 is configured as the mode for the D2D communication and the type 2 is configured as the type 2 of the D2D discovery, a transmit power that is configured for the type of D2D discovery is used for the transmission of the first D2DSS/first PD2DSCH and the transmission of the fourth D2DSS/fourth PD2DSCH.

That is, the transmit power that is used for the transmission of the first D2DSS/first PD2DSCH and the transmission of the fourth D2DSS/fourth PD2DSCH may be configured based on the priority level of the mode for the D2D communication and/or the type of D2D discovery, which is stipulated in advance.

At this point, as described above, in the case where the contention occurs between the transmission of the first D2DSS/first PD2DSCH and the transmission of the fourth D2DSS/fourth PD2DSCH, the priority level of the mode for the D2D communication and/or the type of D2D discovery may be used for determining which D2DSS/PD2DSCH is transmitted.

For example, in the case where the priority level described above is stipulated, if the mode 1 is configured as the mode for the D2D communication, the type 2 is configured as the type of the D2D discovery, and the transmission of the first D2DSS/first PD2DSCH and the transmission of the fourth D2DSS/fourth PD2DSCH occur in the same subframe, a transmit power that is used for the transmission of the fourth D2DSS/fourth PD2DSCH in the same subframe may be a transmit power that is configured for the D2D communication mode 1 based on the priority level.

Furthermore, for example, in the case where the priority level described above is stipulated, if the mode 2 is configured as the mode for the D2D communication, the type 2 is configured as the type of the D2D discovery, and the transmission of the first D2DSS/first PD2DSCH and the transmission of the fourth D2DSS/fourth PD2DSCH occur in the same subframe, a transmit power that is used for the transmission of the first D2DSS/first PD2DSCH in the same subframe may be a transmit power that is configured for the type 2 of D2D discovery based on the priority level.

A constitution of the device according to the present embodiment will be described below.

Figure 6:
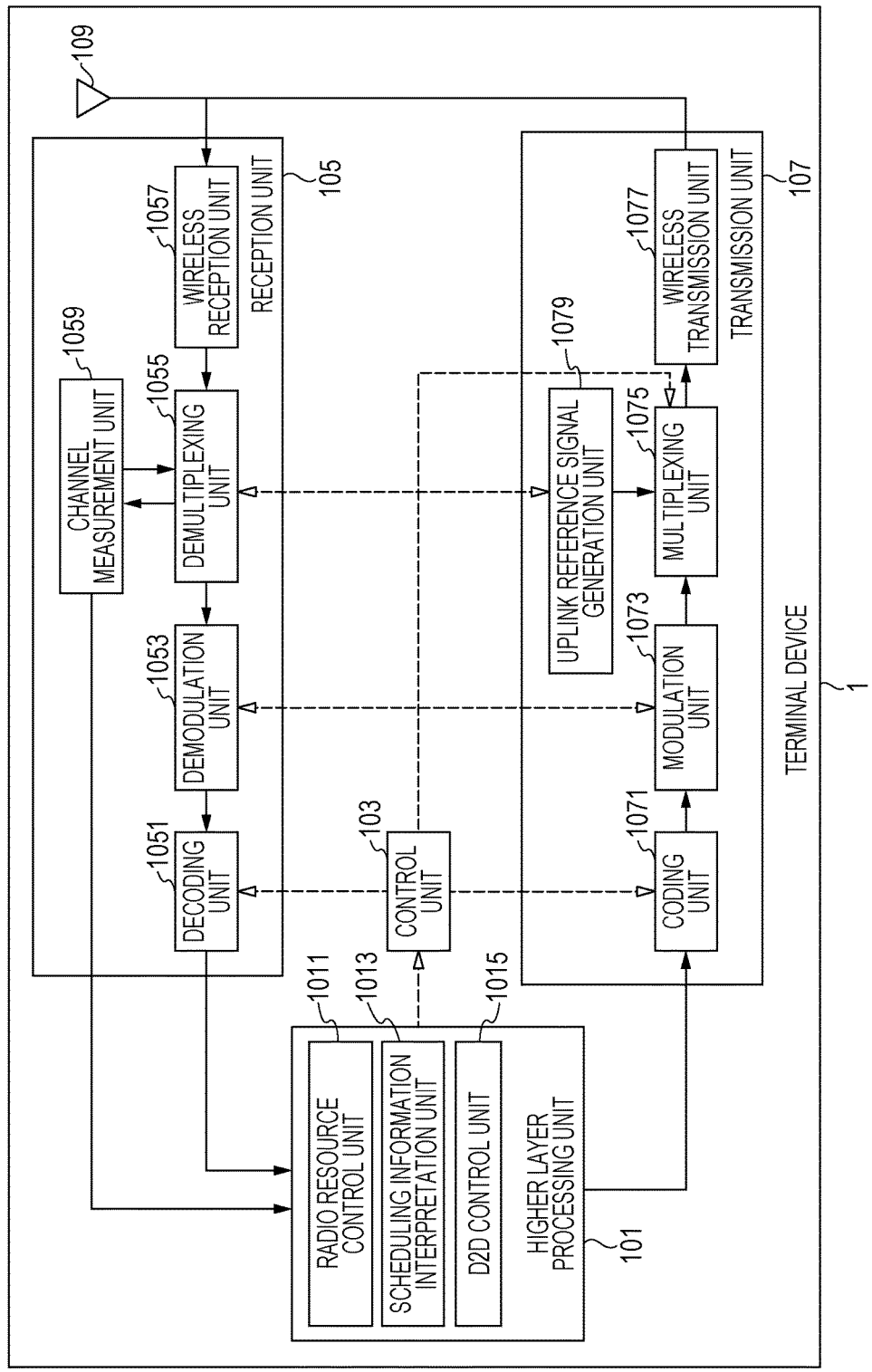
FIG. 6 is a schematic block diagram illustrating a constitution of a terminal device 1 according to the present embodiment.

FIG. 6 is a schematic block diagram illustrating a constitution of the terminal device 1 according to the present embodiment. As illustrated, the terminal device 1 is constituted to include a higher layer processing unit 101, a control unit 103, a reception unit 105, a transmission unit 107, and a transmit and receive antenna unit 109. Furthermore, the higher layer processing unit 101 is constituted to include a radio resource control unit 1011, a scheduling information interpretation unit 1013, and a D2D control unit 1015. Furthermore, the reception unit 105 is constituted to include a decoding unit 1051, a demodulation unit 1053, a demultiplexing unit 1055, a wireless reception unit 1057, and a channel measurement unit 1059. Furthermore, the transmission unit 107 is constituted to include a coding unit 1071, a modulation unit 1073, a multiplexing unit 1075, a wireless transmission unit 1077, and an uplink reference signal generation unit 1079.

The higher layer processing unit 101 outputs the uplink data (the transport block) that is generated by a user operation and the like, to the transmission unit 107. Furthermore, the higher layer processing unit 101 performs processing of a Medium Access Control (MAC) layer, a Packet Data Convergence Protocol (PDCP) layer, a Radio Link Control (RLC) layer, and a Radio Resource Control (RRC) layer.

The radio resource control unit 1011 that is included in the higher layer processing unit 101 manages various pieces of configuration information of the terminal device 1 itself or various parameters for the terminal device 1 itself. The radio resource control unit 1011 sets various pieces of configuration information/parameters based on the higher layer signal that is received from the base station device 3. That is, the radio resource control unit 1011 sets various pieces of configuration information/parameters based on pieces of information indicating various pieces of configuration information/parameters that are received from the base station device 3. Furthermore, the radio resource control unit 1011 generates information that is mapped to each channel in the uplink and outputs the generated information to the transmission unit 107.

The scheduling information interpretation unit 1013 that is included in the higher layer processing unit 101 interprets the DCI format (the scheduling information) that is received through the reception unit 105, generates control information for performing control of the reception unit 105 and the transmission unit 107 based on a result of interpreting the DCI format, and outputs the generated control information to the control unit 103.

The D2D control unit 1015 that is included in the higher layer processing unit 101 performs control of the D2D discovery, the D2D communication, and/or ProSe-assisted WLAN direct communication, based on various pieces of configuration information/parameters that are managed by the radio resource control unit 1011. Moreover, the D2D control unit 1015 may control whether or not the D2DSS/PD2DSCH is transmitted to at least one terminal device 1. Furthermore, the D2D control unit 1015 performs control of a CP length that is used for the transmission of the D2DSS/PD2DSCH. Furthermore, the D2D control unit 1015 performs control of a transmit power that is used for the transmission of the D2DSS/PD2DSCH. The D2D control unit 1015 may generate information that is associated with the D2D, which is transmitted to a different terminal device 1 or the EUTRAN (the base station device 3).

The control unit 103 generates a control signal for performing the control of the reception unit 105 and the transmission unit 107, based on control information from the higher layer processing unit 101. The control unit 103 outputs the generated control signal to the reception unit 105 and the transmission unit 107, and performs the control of the reception unit 105 and the transmission unit 107.

In accordance with the control signal that is input from the control unit 103, the reception unit 105 demultiplexes, demodulates, and decodes a reception signal that is received from the base station device 3 through the transmit and receive antenna unit 109, and outputs information that results from the decoding, to the higher layer processing unit 101.

The wireless reception unit 1057 converts (down-converts) a downlink signal that is received through the transmit and receive antenna unit 109 into a signal in a baseband by performing orthogonal demodulation, removes a unnecessary frequency component, controls an amplification level in such a manner that a signal level is suitably maintained, performs orthogonal demodulation based on an in-phase component and an orthogonal component of the received signal, and converts the analog signal that results from the orthogonal demodulation, into a digital signal. The wireless reception unit 1057 removes a portion that is equivalent to a Cyclic Prefix (CP) from the digital signal that results from the conversion, performs Fast Fourier Transform (FFT) on the signal from which the CP is removed, and extracts a signal in the frequency domain.

The demultiplexing unit 1055 demultiplexes the extracted signal into the PHICH, the PDCCH, the EPDCCH, the PDSCH, and the downlink reference signal. Furthermore, the demultiplexing unit 1055 performs compensation on channels, that is, the PHICH, the PDCCH, the EPDCCH, and the PDSCH, using a channel estimation value that is input from the channel measurement unit 1059. Furthermore, the demultiplexing unit 1055 outputs the downlink reference signal that results from the demultiplexing to the channel measurement unit 1059.

The demodulation unit 1053 multiplies the PHICH by a corresponding code for compositing, performs demodulation in compliance with a Binary Phase Shift Keying (BPSK) modulation scheme on the resulting composite signal, and outputs a result of the demodulation to the decoding unit 1051. The decoding unit 1051 decodes the PHICH that is destined for the terminal device 1 itself, and outputs the HARQ indicator that results from the decoding to the higher layer processing unit 101. The demodulation unit 1053 performs demodulation in compliance with a QPSK modulation scheme on the PDCCH and/or the EPDCCH, and outputs a result of the demodulation to the decoding unit 1051. The decoding unit 1051 makes an attempt to perform the decoding of the PDCCH and/or the EPDCCH, and, in a case where it succeeds in the decoding, outputs the Downlink Control Information that results from the decoding and an RNTI to which the Downlink Control Information corresponds, to the higher layer processing unit 101.

The demodulation unit 1053 performs the demodulation on the PDSCH in compliance with a modulation scheme that is notified with the downlink grant, such as Quadrature Phase Shift keying (QPSK), 16 Quadrature Amplitude Modulation (QAM), or 64 QAM, and outputs a result of the demodulation to the decoding unit 1051. The decoding unit 1051 performs decoding based on information relating to a coding rate that is notified with the Downlink Control Information, and outputs downlink data (a transport block) that results from the decoding, to the higher layer processing unit 101.

The channel measurement unit 1059 measures a downlink path loss or a channel state from the downlink reference signal that is input from the demultiplexing unit 1055, and outputs the measured path loss or the channel state to the higher layer processing unit 101. Furthermore, the channel measurement unit 1059 calculates a downlink channel estimation value from the downlink reference signal and outputs the calculated downlink channel estimation value to the demultiplexing unit 1055. The channel measurement unit 1059 performs channel measurement and/or interference measurement in order to calculate a CQI.

The transmission unit 107 generates the uplink reference signal in accordance with the control signal, which is input from the control unit 103, performs the coding and the modulation on the uplink data (the transport block), which is input from the higher layer processing unit 101, multiplexes the PUCCH, the PUSCH, and the generated uplink reference signal, and transmits a result of the multiplexing to the base station device 3 through the transmit and receive antenna unit 109.

The coding unit 1071 performs the coding, such as convolutional coding and block coding, on the uplink control information that is input from the higher layer processing unit 101. Furthermore, the coding unit 1071 performs turbo coding, based on information that is used for the scheduling of the PUSCH.

The modulation unit 1073 performs the modulation on coded bits, which are input from the coding unit 1071, in compliance with a modulation scheme that is notified with the Downlink Control Information, such as BPSK, QPSK, 16 QAM, or 64 QAM, or in compliance with a modulation scheme that is prescribed in advance for every channel. Based on the information that is used for the scheduling of the PUSCH, the modulation unit 1073 determines the number of sequences of pieces of data that are spatially multiplexed, maps multiple pieces of uplink data that are transmitted on the same PUSCH, to multiple sequences, by using Multiple Input Multiple Output (MIMO) Spatial Multiplexing (SM), and performs precoding on the sequences.

The uplink reference signal generation unit 1079 generates a sequence that is acquired according to a rule (an expression) that is prescribed in advance, based on a physical layer cell identifier (which is also referred to as a physical layer cell identity (PCI), a Cell ID, or the like) for identifying the base station device 3, a bandwidth to which the uplink reference signal is mapped, a cyclic shift that is notified with the uplink grant, a value of a parameter for generation of a DMRS sequence, and the like. In accordance with the control signal that is input from the control unit 103, the multiplexing unit 1075 re-maps modulation symbols of the PUSCH in parallel and then performs Discrete Fourier Transform (DFT) on the resulting modulation symbols. Furthermore, the multiplexing unit 1075 multiplexes PUCCH and PUSCH signals and the generated uplink reference signal for every transmit antenna port. More precisely, the multiplexing unit 1075 maps the PUCCH and PUSCH signals and the generated uplink reference signal to resource elements for every transmit antenna port.

The wireless transmission unit 1077 performs Inverse Fast Fourier Transform (IFFT) on a signal that results from the multiplexing, generates an SC-FDMA symbol, attaches a CP to the generated SC-FDMA symbol, generates a digital signal in a baseband, converts the digital signal in the baseband into an analog signal, removes a superfluous frequency component using a low pass filter, performs up-converting into a carrier frequency, performs power amplification, and outputs a final result to the transmit and receive antenna unit 109 for transmission.

Figure 7:
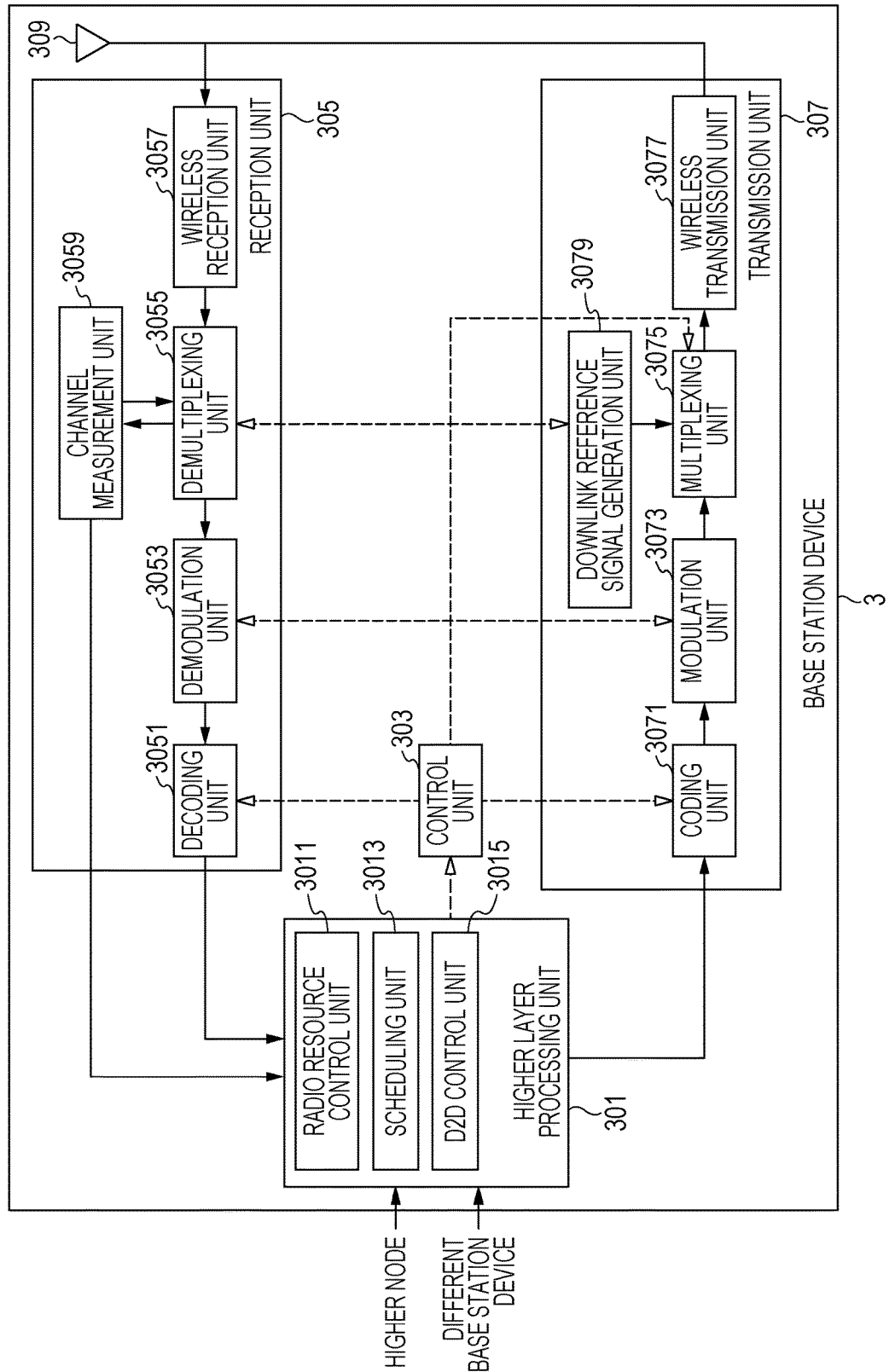
FIG. 7 is a schematic block diagram illustrating a constitution of a base station device 3 according to the present embodiment.

FIG. 7 is a schematic block diagram illustrating a constitution of the base station device 3 according to the present embodiment. As illustrated, the base station device 3 is constituted to include a higher layer processing unit 301, a control unit 303, a reception unit 305, a transmission unit 307, and a transmit and receive antenna unit 309. Furthermore, the higher layer processing unit 301 is constituted to include a radio resource control unit 3011, a scheduling unit 3013, and a D2D control unit 3015. Furthermore, the reception unit 305 is constituted to include a decoding unit 3051, a demodulation unit 3053, a demultiplexing unit 3055, a wireless reception unit 3057, and a channel measurement unit 3059. Furthermore, the transmission unit 307 is constituted to include a coding unit 3071, a modulation unit 3073, a multiplexing unit 3075, a wireless transmission unit 3077, and a downlink reference signal generation unit 3079.

The higher layer processing unit 301 performs the processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates a control signal in order to perform control of the reception unit 305 and the transmission unit 307, and outputs the generated control information to the control unit 303.

The radio resource control unit 3011 that is included in the higher layer processing unit 301 generates, or acquires from a higher level node, the downlink data (the transport block) that is mapped to the PDSCH in the downlink, system information, the RRC message, a MAC Control Element (CE), and the like, and outputs a result of the generation or of the acquirement to the transmission unit 307. Furthermore, the radio resource control unit 3011 manages various pieces of configuration information of each of the terminal devices 1 or various parameters for each of the terminal devices 1. The radio resource control unit 1011 may set various pieces of configuration information/parameters for each of the terminal devices 1 through the higher layer signal. That is, the radio resource control unit 1011 transmits/broadcasts pieces of information indicating various pieces of configuration information/parameters.

The scheduling unit 3013 that is included in the higher layer processing unit 301 determines a frequency and a subframe to which the physical channel (the PDSCH and the PUSCH) is allocated, the coding rate and the modulation scheme for the physical channel (the PDSCH and the PUSCH), the transmit power, and the like, from the received channel state information and from the channel estimation value, the channel quality, or the like that is input from the channel measurement unit 3059. The scheduling unit 3013 generates the control information (for example, the DCI format) in order to perform the control of the reception unit 305 and the transmission unit 307 based on a result of the scheduling, and outputs the generated information to the control unit 303. Furthermore, the scheduling unit 3013 determines a timing when the transmission processing and reception processing are performed.

The D2D control unit 3015 that is included in the higher layer processing unit 301 performs control of the D2D discovery, the D2D communication, and/or the ProSe-assisted WLAN direct communication in the terminal device 1 that performs the communication using the cellular link, based on various pieces of configuration information/parameters that are managed by the radio resource control unit 3011. The D2D control unit 3015 may generate the information that is associated with the D2D, which is transmitted to a different base station device 3 or the terminal device 1. Furthermore, the D2D control unit 3015 performs the control of the CP length that is used for the transmission of the D2DSS/PD2DSCH. Furthermore, the D2D control unit 3015 performs the control of the transmit power that is used for the transmission of the D2DSS/PD2DSCH.

The control unit 303 generates a control signal for performing the control of the reception unit 305 and the transmission unit 307, based on control information from the higher layer processing unit 301. The control unit 303 outputs the generated control signal to the reception unit 305 and the transmission unit 307, and performs the control of the reception unit 305 and the transmission unit 307.

In accordance with the control signal that is input from the control unit 303, the reception unit 305 demultiplexes, demodulates, and decodes a reception signal that is received from the terminal device 1 through the transmit and receive antenna unit 309, and outputs information that results from the decoding, to the higher layer processing unit 301. The wireless reception unit 3057 converts (down-converts) an uplink signal that is received through the transmit and receive antenna unit 309 into a signal in a baseband by performing the orthogonal demodulation, removes an unnecessary frequency component, controls an amplification level in such a manner that a signal level is suitably maintained, performs the orthogonal demodulation based on an in-phase component and an orthogonal component of the received signal, and converts the analog signal that results from the orthogonal demodulation, into a digital signal.

The wireless reception unit 3057 removes a portion that is equivalent to the Cyclic Prefix (CP), from the digital signal that results from the conversion. The wireless reception unit 3057 performs the Fast Fourier Transform (FFT) on the signal from which the CP is removed, extracts a signal in the frequency domain, and outputs the extracted signal to the demultiplexing unit 3055.

The demultiplexing unit 1055 demultiplexes the signal that is input from the wireless reception unit 3057, into the PUCCH, the PUSCH, the uplink reference signal, and the like. Moreover, the demultiplexing is performed based on radio resource allocation information that the base station device 3 determines in advance, using the radio resource control unit 3011, and that is included in the uplink grant which is notified to each of the terminal devices 1. Furthermore, the demultiplexing unit 3055 performs the configuration on the channels, that is, the PUCCH and the PUSCH, using the channel estimation value that is input from the channel measurement unit 3059. Furthermore, the demultiplexing unit 3055 outputs the uplink reference signal that results from the demultiplexing, to the channel measurement unit 3059.

The demodulation unit 3053 performs Inverse Discrete Fourier Transform (IDFT) on the PUSCH, acquires a modulation symbol, and performs reception signal demodulation on each of the modulation symbols of the PUCCH and the PUSCH, using the modulation scheme that is prescribed in advance, such as Binary Phase Shift Keying (BPSK), QPSK, 16 QAM, or 64 QAM, or using the modulation scheme that the base station device 3 itself notifies, in advance with the uplink grant, to each of the terminal devices 1. The demodulation unit 3053 demultiplexes the modulation symbols of the multiple pieces of uplink data that are transmitted on the same PUSCH by using the MIMO SM, based on the number of spatially multiplexed sequences that is notified in advance with the uplink grant to each of the terminal devices 1 and on information designating the precoding that is performed on the sequences.

The decoding unit 3051 performs the decoding on coded bits of the PUCCH and the PUSCH that result from the demodulation, at a coding rate in compliance with the coding scheme that is prescribed in advance, or at a coding rate which the base station device 3 itself notifies, in advance with the uplink grant, to the terminal device 1, and outputs uplink data and uplink control information that result from the decoding, to the higher layer processing unit 101. In a case where the PUSCH is re-transmitted, the decoding unit 3051 performs the decoding using the coded bits that are input from the higher layer processing unit 301 and that are retained in a HARQ buffer, and the coded bits that results from the demodulation. The channel measurement unit 309 measures the channel estimation value, the channel quality, and the like, from the uplink reference signal that is input from the demultiplexing unit 3055, and outputs a result of the measurement to the demultiplexing unit 3055 and the higher layer processing unit 301.

The transmission unit 307 generates the downlink reference signal in accordance with the control signal that is input from the control unit 303, codes and modulates the HARQ indicator, the Downlink Control Information, and the downlink data that are input from the higher layer processing unit 301, multiplexes the PHICH, the PDCCH, the EPDCCH, the PDSCH, and the downlink reference signal, and transmits the resulting signal to the terminal device 1 through the transmit and receive antenna unit 309.

The coding unit 3071 performs the coding on the HARQ indicator, the Downlink Control Information, and the downlink data that are input from the higher layer processing unit 301, using the coding scheme that is prescribed in advance, such as the block coding, the convolutional coding, or the turbo coding, or using the coding scheme that is determined by the radio resource control unit 3011. The modulation unit 3073 performs the modulation on the coded bits that are input from the coding unit 3071, using the modulation scheme that is prescribed in advance, such as BPSK, QPSK, 16 QAM, or 64 QAM, or using the modulation scheme that is determined by the radio resource control unit 3011.

The downlink reference signal generation unit 3079 generates as the downlink reference signal a sequence that is already known to the terminal device 1 and that is acquired according to a rule that is prescribed in advance based on the physical layer cell identifier (PCI) for identifying the base station device 3, and the like. The multiplexing unit 3075 multiplexes a modulation symbol of each channel, which results from the modulation, and the generated downlink reference signal. More precisely, the multiplexing unit 3075 maps a modulation symbol of each channel, which results from the modulation, and the generated downlink reference signal, to resource elements.

The wireless transmission unit 3077 performs the Inverse Fast Fourier Transform (IFFT) on a modulation symbol and the like that result from the multiplexing, generates an OFDM symbol, attaches a CP to the generated OFDM symbol, generates a digital signal in a baseband, converts the digital signal in the baseband into an analog signal, removes a superfluous frequency component using a low pass filter, performs up-converting into a carrier frequency, performs power amplification, and outputs a final result to the transmit and receive antenna unit 309 for transmission.

A terminal device 1 according to the present embodiment, which is a terminal device 1 that communicates with a different terminal device, and a base station device, includes a transmission unit 107 that compares a first parameter relating to a transmit power which is configured for D2D discovery, a transmit power that is calculated using an estimation value of a path loss between the different base station device and the terminal device, with each other, compares a second parameter relating to a transmit power that is configured for D2D communication, and the transmit power that is calculated using the estimation value of the path loss, with each other, and, using a higher transmit power, transmits a D2DSS and/or a PD2DSCH.

Furthermore, a terminal device 1 according to the present embodiment, which is a terminal device 1 that communicates with a different terminal device, and a base station device, includes a transmission unit 107 that transmits a first D2DSS and/or a first PD2DSCH using a transmit power which is calculated based on a first parameter relating to a transmit power that is configured for D2D discovery, and on an estimation value of a path loss between the base station device and the different terminal device, and that transmits a second D2DSS and/or a second PD2DSCH using a transmit power which is calculated based on a second parameter relating to a transmit power that is configured for D2D communication, and on the estimation value of the path loss, in which the first D2DSS and/or the first PD2DSCH is periodically transmitted in a head subframe within a resource pool for the D2D discovery that is configured using first information which is included in a higher layer signal, and in which the second D2DSS and/or the second PD2DSCH is periodically transmitted in a subframe that is configured using second information which is included in the higher layer signal.

Furthermore, a base station device 3 according to the present embodiment, which is a base station device 3 that controls a terminal device 1 which communicates with a different terminal device, includes a transmission unit 307 that transmits a first parameter for configuring a transmit power for D2D discovery, and a second parameter for configuring a transmit power for D2D communication, in which the first parameter and a transmit power that is calculated using an estimation value of a path loss between the base station device and the terminal device are compared with each other, the second parameter and the transmit power that is calculated using the estimation value of the path loss are compared with each other, and a D2DSS and/or a PD2DSCH is transmitted using a high transmit power.

Furthermore, a base station device 3 according to the present embodiment, which is a base station device 3 that controls a terminal device 1 which communicates with a different terminal device, includes a transmission unit 307 that transmits a first parameter for configuring a transmit power for D2D discovery, a second parameter for configuring a transmit power for D2D communication, first information, and second information, in which a first D2DSS and/or a first PD2DSCH is transmitted using a transmit power that is calculated based on the first parameter and an estimation value of a path loss between the base station device and the terminal device, in which a second D2DSS and/or a second PD2DSCH is transmitted using a transmit power that is calculated based on the second parameter and the estimation value of the path loss, in which the first D2DSS and/or the first PD2DSCH is periodically transmitted in a head subframe within a resource pool for the D2D discovery that is configured using the first information, and in which the second D2DSS and/or the second PD2DSCH is periodically transmitted in a subframe that is configured using the second information.

Furthermore, a terminal device 1 according to the present embodiment, which is a terminal device 1 that communicates with a different terminal device and a base station device, includes a transmission unit 107 that compares a first CP length that is configured for D2D discovery and a second CP length that is configured for D2D communication, with each other, and, using a longer CP length, transmits a D2DSS and/or a PD2DSCH.

Furthermore, a terminal device 1 according to the present embodiment, which is a terminal device 1 that communicates with a different terminal device, and a base station device, includes a transmission unit 107 that transmits a first D2DSS and/or a first PD2DSCH using a first CP length which is configured for D2D discovery, and that transmits a second D2DSS and/or a second PD2DSCH using a second CP length which is configured for D2D communication, in which the first D2DSS and the first PD2DSCH is periodically transmitted in a head subframe within a resource pool for the D2D discovery that is configured using first information which is included in a higher layer signal, and in which the second D2DSS and the second PD2DSCH is periodically transmitted in a subframe that is configured using second information which is included in the higher layer signal.

Furthermore, a base station device 3 according to the present embodiment, which is a base station device 3 that controls a terminal device 1 which communicates with a different terminal device, includes a transmission unit 307 that transmits a first parameter for configuring a first CP length for D2D discovery, and a second parameter for configuring a second CP length for D2D communication, in which the first CP length and the second CP length are compared, and a D2DSS and a PD2DSCH is used using a longer CP length.

Furthermore, a base station device 3 according to the present embodiment, which is a base station device 3 that controls a terminal device 1 which communicates with a different terminal device, includes a transmission unit 307 that transmits a first parameter for configuring a first CP length for D2D discovery, a second parameter for configuring a second CP length for D2D communication, first information, and second information, in which a first D2DSS and/or a first PD2DSCH is transmitted using a first CP length, in which a second D2DSS and/or a second PD2DSCH is transmitted using a second CP length, in which the first D2DSS and/or the first PD2DSCH is periodically transmitted in a head subframe within a resource pool for the D2D discovery that is configured using the first information, and in which the second D2DSS and/or the second PD2DSCH is periodically transmitted in a subframe that is configured using the second information.

Accordingly, the D2D can be efficiently performed between the terminal devices 1. For example, the CP length for the D2D can be efficiently controlled. Furthermore, for example, a transmit power for the D2D can be efficiently controlled.

A program running on the base station device 3 and the terminal device 1 according to the present invention may be a program (a program for causing a computer to operate) that controls a Central Processing Unit (CPU) and the like in such a manner as to realize the functions according to the embodiments of the present invention, which are described above. Then, pieces of information that are handled in these devices temporarily accumulate in a Random Access Memory (RAM) while being processed. Thereafter, the pieces of information are stored in various types of ROMs such as a Flash Read Only Memory (ROM), or a Hard Disk Drive (HDD), and if need arises, are read by the CPU to be modified or written.

Moreover, one portion of each of the terminal device 1 and the base station device 3 according to the embodiments, which are described above, may be realized by the computer. In such a case, the portion may be realized by recording a program for realizing such a control function on a computer-readable medium and causing a computer system to read the program recorded on the recording medium for execution.

Moreover, the "computer system" here is defined as a computer system that is built in the terminal device 1 or the base station device 3 and as including an OS or hardware components such as a peripheral device. Furthermore, the "computer-readable recording medium" refers to a portable medium, such as a flexible disk, a magneto-optical disk, a ROM, and a CD-ROM, and a storage device, such as a hard disk, that is built in the computer system.

Moreover, the "computer-readable recording media" may include a medium that dynamically retains the program for a short period of time, such as a communication line that is available when transmitting the program over a network such as the Internet or over a communication network such as a telephone network, and a medium that retains the program for a fixed period of time, such as a volatile memory within the computer system, which functions as a server or a client in a case where the program is retained dynamically for a short period of time. Furthermore, the program may be one for realizing some of the functions described above and may be one that can realize the functions described above in combination with a program that is already recorded on the computer system.

Furthermore, the base station device 3 according to the embodiment, which is described above, can be realized as an aggregation (a device group) that is constituted from multiple devices. Each of the devices that constitute the device group may be equipped with some portions or all portions of each function of, or some portions or all portions of each functional block of the base station device 3 according to the embodiment, which is described. The device group itself may have each general function of or each general functional block of the base station device 3. Furthermore, it is also possible that the terminal device 1 according to the embodiments, which is described, communicates with the base station device as an aggregation.

Furthermore, the base station device 3 according to the embodiment, which is described, may be the Evolved Universal Terrestrial Radio Access Network (EUTRAN). Furthermore, the base station device 3 according to the embodiment, which is described above, may have some portions or all portions of a function of a node that is at a higher level than an eNodeB.

Furthermore, some portions or all portions of each of the terminal device 1 and the base station device 3 according to the embodiment, which are described above, may be realized as an LSI that is a typical integrated circuit and may be realized as a chip set. Each functional block of each of the terminal device 1 and the base station device 3 may be individually realized into a chip, and some or all of the functional blocks may be integrated into a chip. Furthermore, a circuit integration technique is not limited to the LSI, and an integrated circuit for the functional block may be realized as a dedicated circuit or a general-purpose processor. Furthermore, if with advances in semiconductor technology, a circuit integration technology for a circuit with which an LSI is replaced will appear, it is also possible that an integrated circuit to which such a technology applies is used.

Furthermore, according to the embodiments, which are described above, the terminal device is described as one example of a communication device, but the present invention is not limited to this, and can also be applied to a terminal device or a communication apparatus, such as a fixed-type electronic apparatus that is installed indoors or outdoors, or a stationary-type electronic apparatus, for example, an AV apparatus, a kitchen apparatus, a cleaning or washing machine, an air conditioner, office equipment, a vending machine, and other household apparatuses.

The embodiments of the invention are described in detail above referring to the drawings, but the specific constitution is not limited to the embodiments and also includes an amendment to a design and the like that fall within the scope that does not depart from the gist of the present invention. Furthermore, various modifications are possible within the scope of the present invention defined by claims, and embodiments that are implemented by suitably combining technical means that are disclosed according to different embodiments also fall within the technical scope of the present invention. Furthermore, a configuration in which a constituent element that achieves the same effect is substituted for the one that is described above according to each embodiment described above also falls within the technical scope of the present invention.

INDUSTRIAL APPLICABILITY

Application of the present invention is possible in the fields of a communication apparatus including a terminal device and a base station device, and of other electronic apparatuses.

DESCRIPTION OF REFERENCE NUMERALS

1 (1A, 1B, 1C) TERMINAL DEVICE
3 BASE STATION DEVICE
101 HIGHER LAYER PROCESSING UNIT
103 CONTROL UNIT
105 RECEPTION UNIT
107 TRANSMISSION UNIT
109 TRANSMIT AND RECEIVE ANTENNA UNIT
301 HIGHER LAYER PROCESSING UNIT
303 CONTROL UNIT
305 RECEPTION UNIT
307 TRANSMISSION UNIT
309 TRANSMIT AND RECEIVE ANTENNA UNIT
1011 RADIO RESOURCE CONTROL UNIT
1013 SCHEDULING INFORMATION INTERPRETATION UNIT
1015 D2D CONTROL UNIT
3011 RADIO RESOURCE CONTROL UNIT
3013 SCHEDULING UNIT
3015 D2D CONTROL UNIT

The invention claimed is:
1. A first terminal device comprising:
device-to-device (D2D) control circuitry;
radio resource control circuitry; and
memory associated with the D2D control circuitry and the radio resource control circuitry; wherein the D2D control circuitry:
controls a first transmit power for transmission of first information based on a first parameter that is configured via a higher layer,
controls a second transmit power for transmission of second information based on a second parameter that is configured via the higher layer, and
controls a third transmit power for transmission of a first synchronization signal, third information, a second synchronization signal, and fourth information, by using one third parameter that is configured via the higher layer, the third transmit power being common to all of the first synchronization signal, the third information, the second synchronization signal, and the fourth information; and
the radio resource control circuitry configures a first resource, a second resource, a third resource, and a fourth resource;
the first resource is for the transmission of the first information for scheduling a physical channel, the physical channel being for the transmission of the second information from the first terminal device to a second terminal device;
the second resource is for the transmission of the second information;
the third resource is for the transmission of the first synchronization signal and the third information for indicating a frame number;
the fourth resource is for transmission of the second synchronization signal and the fourth information for indicating a frame number; and
the first information, the second information, the third information, and the fourth information are all independent from one another.

2. The first terminal device according to claim 1, further comprising: transmission circuitry that transmits, to the second terminal device, the first information, the first synchronization signal, the third information, the second synchronization signal, and the fourth information.

3. The first terminal device according to claim 1, wherein the radio resource control circuitry configures the third resource based on a fourth parameter that is configured via the higher layer, and the fourth resource based on a fifth parameter that is configured via the higher layer.

4. A communication method for a first terminal device, comprising:
controlling a first transmit power for transmission of first information based on a first parameter that is configured via a higher layer;
controlling a second transmit power for transmission of second information based on a second parameter that is configured via the higher layer;
controlling a third transmit power for transmission of a first synchronization signal, the third information, a second synchronization signal, and fourth information by using one third parameter that is configured via the higher layer, the third transmit power being common to all of the first synchronization signal, the third information, the second synchronization signal, and the fourth information;
configuring a first resource, a second resource, a third resource, and a fourth resource; wherein
the first resource is for the transmission of the first information which is used for scheduling a physical channel, the physical channel being for the transmission of second information from the first terminal device to a second terminal device;
the second resource is for the transmission of the second information;
the third resource is for the transmission of the first synchronization signal and the third information for indicating a frame number;
the fourth resource is for the transmission of the second synchronization signal and the transmission of the fourth information for indicating a frame number; and
the first information, the second information, the third information, and the fourth information are all independent from one another.

5. The communication method according to claim 4 further comprising: transmitting, to the second terminal device, the first information, the first synchronization signal, the third information, the second synchronization signal, and the fourth information.

6. The communication method according to claim 4 further comprising:
configuring the third resource based on a fourth parameter that is configured via the higher layer; wherein
the fourth resource is based on a fifth parameter that is configured via the higher layer.

7. An integrated circuit and an associated memory that is built in a first terminal device, the integrated circuit causes the first terminal device to perform functions of at least:
controlling a first transmit power for transmission of the first information based on a first parameter that is configured via a higher layer;
controlling a second transmit power for transmission of second information based on a second parameter that is configured via the higher layer;
controlling a third transmit power for transmission of a first synchronization signal, third information, a second synchronization signal, and fourth information by using one third parameter that is configured via the higher layer, the third transmit power being common to all of the first synchronization signal, the third information, the second synchronization signal, and the fourth information; and
configuring a first resource, a second resource, a third resource, and a fourth resource, wherein
the first resource is for the transmission of the first information which is used for scheduling a physical channel, the physical channel being for the transmission of the second information from the first terminal device to a second terminal device;
the second resource is for the transmission of the second information;
the third resource is for the transmission of the first synchronization signal and the third information for indicating a frame number;
the fourth resource is for the transmission of the second synchronization signal and the fourth information for indicating a frame number; and
the first information, the second information, the third information, and the fourth information are all independent from one another.

8. The integrated circuit that is built in the first terminal device according to claim 7, wherein the integrated circuit causes the first terminal device to further perform transmitting of the first information, the first synchronization signal, the third information, the second synchronization signal, and the fourth information to the second terminal device.

9. The integrated circuit that is built in the first terminal device according to claim 7, wherein the integrated circuit causes the first terminal device to further perform configuring of the third resource based on a fourth parameter that is configured via the higher layer; and
the fourth resource based on a fifth parameter that is configured via the higher layer.

* * * * *